(12) United States Patent
Gaertner et al.

(10) Patent No.: US 11,281,403 B2
(45) Date of Patent: Mar. 22, 2022

(54) CIRCUITRY AND METHOD

(71) Applicant: Arm Limited, Cambridge (GB)

(72) Inventors: Thomas Franz Gaertner, Sheffield (GB); Viswanath Chakrala, Sheffield (GB); Guanghui Geng, Sheffield (GB)

(73) Assignee: Arm Limited, Cambridge (GB)

( * ) Notice: Subject to any disclaimer, the term of this patent is extended or adjusted under 35 U.S.C. 154(b) by 70 days.

(21) Appl. No.: 16/830,749

(22) Filed: Mar. 26, 2020

(65) Prior Publication Data
US 2021/0303201 A1 Sep. 30, 2021

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0659; G06F 3/0604; G06F 3/0673; G06F 9/466; G06F 12/1027; G06F 12/08; G06F 12/0802; G06F 12/1036; G06F 2212/30; G06F 2212/50; G06F 2212/68; G06F 2212/681; G06F 2212/684
See application file for complete search history.

(56) References Cited

U.S. PATENT DOCUMENTS

| | | | | |
|---|---|---|---|---|
| 2012/0290752 A1* | 11/2012 | Lim | .................... | G06F 13/4022 710/110 |
| 2015/0199290 A1* | 7/2015 | Mathewson | ........ | G06F 13/4221 710/110 |
| 2017/0091097 A1* | 3/2017 | Waugh | ................ | G06F 12/0815 |
| 2019/0087351 A1* | 3/2019 | Abdul | .................... | G06F 9/467 |
| 2020/0081652 A1* | 3/2020 | Nukala | ................... | G06F 9/544 |

* cited by examiner

*Primary Examiner* — Tracy A Warren
(74) *Attorney, Agent, or Firm* — Nixon & Vanderhye P.C.

(57) ABSTRACT

Circuitry comprises attribute storage circuitry having a plurality of entries to hold data defining at least a transaction attribute of one or more respective data handling transactions initiated by transaction source circuitry; comparator circuitry to compare a transaction attribute of a given data handling transaction with data held by the attribute storage circuitry to detect whether the given data handling transaction would be resolved by any data handling transaction for which attribute data is held by a respective entry in the attribute storage circuitry; and control circuitry to associate the given data handling transaction with the respective entry in the attribute storage circuitry to form a set of associated data handling transactions when the comparator circuitry detects that the given data handling transaction would be fulfilled by the data handling transaction for which attribute data is held by the respective entry in the attribute storage circuitry; the control circuitry comprising output circuitry responsive to a resolution of a data handling transaction in the set of associated data handling transactions, to provide that resolution to the transaction source circuitry as a resolution of each of the set of associated transactions.

17 Claims, 15 Drawing Sheets

| Addr | tail (FFs) | | | | | | | | |
|---|---|---|---|---|---|---|---|---|---|
| 0x0 | x | 1FA0,0 | 0FA0,1FA1 | 0FA0,0FA1 | 0FA0,0FA1 | 0FA0,0FA1 | 0FA0,0FA1 | 0FA0,0FA1 | 0FA0,0FA1 |
| 0x1 | x | x | x | x | 1FB0,- | 1FB0,- | 0FB0,1FB1 | 0FB0,1FB1 | 0FB0,1FB1 |
| 0x2 | x | x | x | x | x | x | x | x | x |
| 0x3 | x | x | x | x | x | x | x | x | x |
| 0x4 | x | x | x | 1FA2,0- | 1FA2,0- | 0FA2,1FA3 | 0FA2,1FA3 | 0FA2,0FA3 | 0FA2,0FA3 |
| 0x5 | x | x | x | x | x | x | x | x | x |
| 0x6 | x | x | x | x | x | x | x | x | x |
| 0x7 | x | x | x | x | x | x | x | x | x |
| 0x8 | x | x | x | x | x | x | x | 1FA4,0- | 0FA4,1FA5 |
| 0x9 | x | x | x | x | x | x | x | x | x |
| 0xa | x | x | x | x | x | x | x | x | x |
| 0xb | x | x | x | x | x | x | x | x | x |
| 0xc | x | x | x | x | x | x | x | x | x |
| 0xd | x | x | x | x | x | x | x | x | x |
| 0xe | x | x | x | x | x | x | x | x | x |
| 0xf | x | x | x | x | x | x | x | x | x |

| ptrRAM (nxt_ptrA,nxt_ptrB) | Addr | | | | | | | | |
|---|---|---|---|---|---|---|---|---|---|
| | 0x0 | x | x | 0x2,- | 0x2,0x4 | 0x2,0x4 | 0x2,0x4 | 0x2,0x4 | 0x2,0x4 |
| | 0x1 | x | x | x | x | x | 0x3,- | 0x3,- | 0x3,- |
| | 0x2 | x | x | x | x | x | x | x | x |
| | 0x3 | x | x | x | x | x | x | x | x |
| | 0x4 | x | x | x | x | x | x | x | x |
| | 0x5 | x | x | x | x | x | x | x | x |
| | 0x6 | x | x | x | x | x | 0x6,- | 0x6,0x8 | 0x6,0x8 |
| | 0x7 | x | x | x | x | x | x | x | x |
| | 0x8 | x | x | x | x | x | x | x | x |
| | 0x9 | x | x | x | x | x | x | x | x |
| | 0xa | x | x | x | x | x | x | x | 0xA,- |
| | 0xb | x | x | x | x | x | x | x | x |
| | 0xc | x | x | x | x | x | x | x | x |
| | 0xd | x | x | x | x | x | x | x | x |
| | 0xe | x | x | x | x | x | x | x | x |
| | 0xf | x | x | x | x | x | x | x | x |

FIG. 16

CIRCUITRY AND METHOD

BACKGROUND

This disclosure relates to circuitry and methods.

Various examples of data processing circuitry make use of so-called data handling transactions to allow upstream circuitry to initiate actions or operations by downstream circuitry. An example of such a transaction is an address translation transaction to obtain an address translation from a downstream translation control unit (TCU) or the like, or for a TCU to obtain a translation from memory.

The present disclosure aims to provide potential improvements with relation to such arrangements.

SUMMARY

In an example arrangement there is provided circuitry comprising:

attribute storage circuitry having a plurality of entries to hold data defining at least a transaction attribute of one or more respective data handling transactions initiated by transaction source circuitry;

comparator circuitry to compare a transaction attribute of a given data handling transaction with data held by the attribute storage circuitry to detect whether the given data handling transaction would be resolved by any data handling transaction for which attribute data is held by a respective entry in the attribute storage circuitry; and control circuitry to associate the given data handling transaction with the respective entry in the attribute storage circuitry to form a set of associated data handling transactions when the comparator circuitry detects that the given data handling transaction would be fulfilled by the data handling transaction for which attribute data is held by the respective entry in the attribute storage circuitry;

the control circuitry comprising output circuitry responsive to a resolution of a data handling transaction in the set of associated data handling transactions, to provide that resolution to the transaction source circuitry as a resolution of each of the set of associated transactions.

In another example arrangement there is provided circuitry comprising:

attribute storage means having a plurality of entries for holding data defining at least a transaction attribute of one or more respective data handling transactions initiated by transaction source means;

comparator means for comparing a transaction attribute of a given data handling transaction with data held by the attribute storage means to detect whether the given data handling transaction would be resolved by any data handling transaction for which attribute data is held by a respective entry in the attribute storage means; and control means for associating the given data handling transaction with the respective entry in the attribute storage means to form a set of associated data handling transactions when the comparator means detects that the given data handling transaction would be fulfilled by the data handling transaction for which attribute data is held by the respective entry in the attribute storage means;

the control means comprising output means responsive to a resolution of a data handling transaction in the set of associated data handling transactions, for providing that resolution to the transaction source means as a resolution of each of the set of associated transactions.

In another example arrangement there is provided a method comprising:

receiving data handling transactions from transaction source circuitry, each data handling transaction being defined by a respective set of one or more transaction attributes;

holding data defining at least a transaction attribute of one or more respective data handling transactions;

comparing a transaction attribute of a given data handling transaction with the held data to detect whether the given data handling transaction would be resolved by any data handling transaction for which attribute data is held;

associating the given data handling transaction with the respective data handling transaction detected by the comparing step to form a set of associated data handling transactions when the comparing step detects that the given data handling transaction would be fulfilled by the respective data handling transaction for which attribute data is held;

providing, in response to resolution of a data handling transaction in the set of associated data handling transactions, that resolution to the transaction source circuitry as a resolution of each of the set of associated transactions.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIGS. 14 to 16 schematically illustrate hazard list data representing a set of transactions;

DESCRIPTION OF EMBODIMENTS

Figure 1:
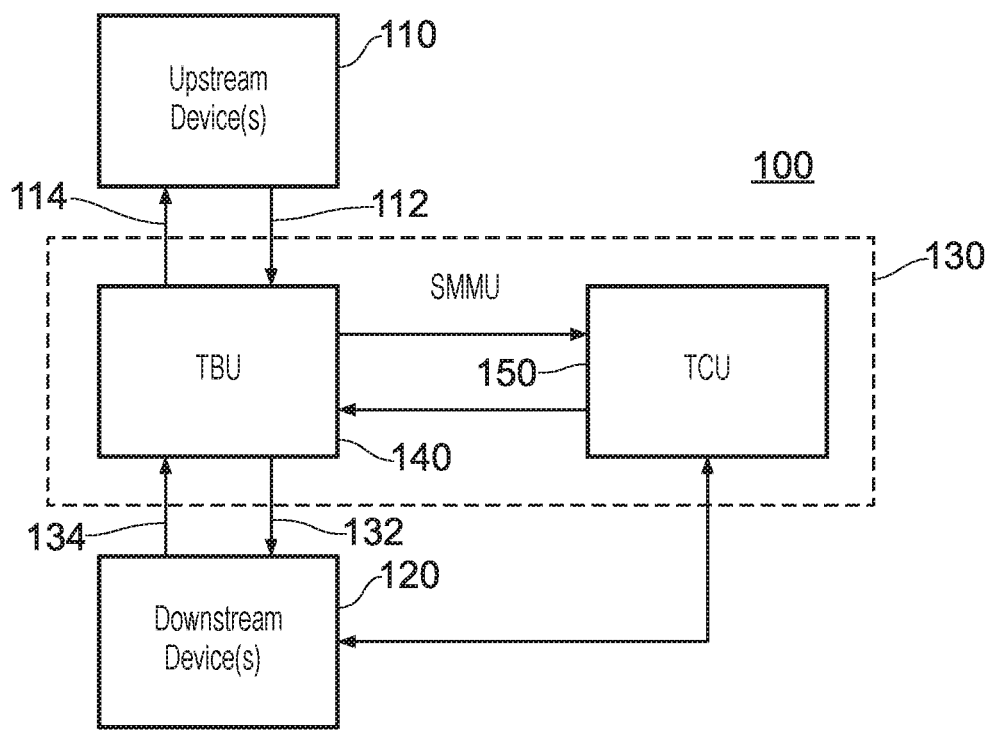
FIG. 1 schematically illustrates an example circuitry.

Before discussing the embodiments with reference to the accompanying figures, the following description of embodiments is provided.

An example embodiment provides circuitry comprising:

attribute storage circuitry having a plurality of entries to hold data defining at least a transaction attribute of one or more respective data handling transactions initiated by transaction source circuitry;

comparator circuitry to compare a transaction attribute of a given data handling transaction with data held by the attribute storage circuitry to detect whether the given data handling transaction would be resolved by any data handling transaction for which attribute data is held by a respective entry in the attribute storage circuitry; and control circuitry to associate the given data handling transaction with the respective entry in the attribute storage circuitry to form a set of associated data handling transactions when the comparator circuitry detects that the given data handling transaction would be fulfilled by the data handling transaction for which attribute data is held by the respective entry in the attribute storage circuitry;

the control circuitry comprising output circuitry responsive to a resolution of a data handling transaction in the set of associated data handling transactions, to provide that resolution to the transaction source circuitry as a resolution of each of the set of associated transactions.

Example embodiments provide an efficient way of overseeing data handling transactions such as address translation transactions, in order that transactions can be associated together so that when an expected transaction response is going to be applicable to another transaction, that response is efficiently re-used for that other transaction.

In example arrangements the control circuitry is configured, when the comparator circuitry detects that the given data handling transaction would not be fulfilled by the data handling transaction for which attribute data is held by any entry in the attribute storage circuitry, to generate, from the given data handling circuitry, an entry for storage by the attribute storage circuitry, and/or the control circuitry is configured, when the comparator circuitry detects that the given data handling transaction would not be fulfilled by the data handling transaction for which attribute data is held by any entry in the attribute storage circuitry, to initiate issue of the given transaction for resolution.

Although the given data handling transaction could be any data handling transaction in a set of associated data handling transactions or could be a previously received data handling transaction, in example embodiments the given data handling transaction is a data handling transaction most recently initiated by the transaction source circuitry.

Although non-ordered or so-called flat lists of associated data handling transactions could be used, in example embodiments the set of associated data handling transactions comprises a linked list of data handling transactions. This can make the traversal of the list more efficient in order to output the transaction response for each data handling transaction in the list, for example from a head or first item to a tail or last item in the list (though the traversal could in other examples be in another direction).

Conveniently, to add a new item to the list, the control circuitry may be configured to associate the given data handling transaction with the respective entry in the attribute storage circuitry as a new last item in the linked list of data handling transactions associated with that entry in the attribute storage circuitry when the comparator circuitry detects that the given data handling transaction would be fulfilled by the data handling transaction for which attribute data is held by the respective entry in the attribute storage circuitry. Similarly the control circuitry may be configured, when the comparator circuitry detects that the given data handling transaction would not be fulfilled by the data handling transaction for which attribute data is held by any entry in the attribute storage circuitry, to create a new linked list having the given data handling transaction as a head list item.

The set of associated data handling transactions may be conveniently stored by a list memory to store data defining at least those of the set of associated data handling transactions which are not currently held by the attribute memory.

In some examples, the list is kept up to date whenever a change is made to the attribute storage circuitry, in which case for example, the control circuitry may be configured to store data defining a data handling transaction in the list memory in response to creation of an entry in the attribute memory for that data handling transaction. In other examples, the control circuitry is configured to store data defining a data handling transaction in the list memory in response to information relating to that data handling transaction being displaced from the attribute storage circuitry by storage of data defining an attribute of another data handling transaction.

For efficiency of subsequent access and to avoid so-called memory to memory access loops, the list memory may be configured to store, as a single entry in the list memory, data defining two or more data handling transactions.

In example embodiments the list memory comprises entries addressable by a transaction identifier of a data handling transaction in the set of associated data handling transactions.

As part of the so-called unwinding of a list so as to output a received resolution for other transactions in the list, the output circuitry may be configured, in response to the resolution of a data handling transaction in the set of associated data handling transactions, to detect whether an entry relating to that resolution is held by the attribute storage circuitry and to detect whether the list memory currently stores data defining a set of associated data handling transactions including the transaction for which the resolution has been received. The check of the attribute storage circuitry can be particularly useful when the set of associated data handling transaction is potentially held at least in part by the attribute storage circuitry as well as by the list memory.

Although the techniques are suited to any type of data handling transaction, they are particularly relevant when the data handling transaction is an address translation transaction to request a translation of an input memory address in an input memory address space to an output memory address in an output memory address space. For example, although so-called intermediate physical addresses could be used, the input memory address may be a virtual memory address; the input memory address space may be a virtual memory address space; the output memory address may be a physical address; and the output memory address space may be a physical address space. In other examples involving one stage of a two-stage memory address translation either the input memory address is a virtual memory address; the input memory address space is a virtual memory address space; the output memory address is an intermediate physical address; and the output memory address space is an intermediate physical address space; or the input memory address is an intermediate physical memory address; the input memory address space is an intermediate physical memory address space; the output memory address is a physical address; and the output memory address space is a physical address space.

The present technology also provides memory address translation circuitry comprising: the circuitry defined above; an address translation buffer to store data defining one or more memory address translations; and transaction source circuitry to issue a data handling transaction to a further circuitry in the case that a required memory address translation is not provided by data currently held in the address translation buffer, the transaction source circuitry being configured to receive data defining the required memory address translation as a resolution of the data handling transaction. In other words the techniques discussed above can be used to oversee the issue of transactions by circuitry such as a so-called translation buffer unit which holds a cached or buffered store of one or more translations. In other examples, the techniques can be employed in respect of the obtaining of translations in response to their non-availability in the buffer (such as a so-called micro TLB), for example in memory address translation circuitry comprising: the further circuitry; in which the further circuitry is configured to interact with a data memory and to issue, as a further data handling transaction, a transaction to obtain data defining the required memory address translation from information stored in the data memory; the further circuitry comprising a further instance of the circuitry defined above, the further instance being configured to control handling of the further data handling transaction.

Another example embodiment provides circuitry comprising:

attribute storage means having a plurality of entries for holding data defining at least a transaction attribute of one or more respective data handling transactions initiated by transaction source means;

comparator means for comparing a transaction attribute of a given data handling transaction with data held by the attribute storage circuitry to detect whether the given data handling transaction would be resolved by any data handling transaction for which attribute data is held by a respective entry in the attribute storage means; and control means for associating the given data handling transaction with the respective entry in the attribute storage means to form a set of associated data handling transactions when the comparator means detects that the given data handling transaction would be fulfilled by the data handling transaction for which attribute data is held by the respective entry in the attribute storage means;

the control means comprising output means responsive to a resolution of a data handling transaction in the set of associated data handling transactions, for providing that resolution to the transaction source means as a resolution of each of the set of associated transactions.

Another example embodiment provides a method comprising:

receiving data handling transactions from transaction source circuitry, each data handling transaction being defined by a respective set of one or more transaction attributes;

holding data defining at least a transaction attribute of one or more respective data handling transactions;

comparing a transaction attribute of a given data handling transaction with the held data to detect whether the given data handling transaction would be resolved by any data handling transaction for which attribute data is held;

associating the given data handling transaction with the respective data handling transaction detected by the comparing step to form a set of associated data handling transactions when the comparing step detects that the given data handling transaction would be fulfilled by the respective data handling transaction for which attribute data is held;

providing, in response to resolution of a data handling transaction in the set of associated data handling transactions, that resolution to the transaction source circuitry as a resolution of each of the set of associated transactions.

Overview of Circuitry

FIG. 1 schematically illustrates data handling circuitry 100 comprising one or more upstream device(s) 110 which communicate with one or more downstream device(s) 120 via a system memory management unit (SMMU) 130.

The upstream device(s) may be, for example, one or more processing elements or central processing units acting as "master" devices in the sense that they are configured to issue data handling transactions 112 for resolution by the downstream device(s) 120. The resolution includes the upstream device(s) 110 receiving one or more respective transaction responses 114.

For example, in the case of a data handling transaction to read a data item (such as a so-called cache line) from a particular memory address held at one of the downstream device(s) 120, the upstream device issuing that request may receive, as a response, first an acknowledgement that the read request is being handled, and then the actual requested data item itself. The initial acknowledgement may be optional in the case of a read transaction. In the case of a data write operation, in which the relevant upstream device 110 provides a data item to be stored at a memory address held by one of the downstream devices 120, the relevant transaction response 114 might be a simple acknowledgement that the write operation has been carried out successfully. (Of course, in both cases, an error or negative acknowledgement response could be provided if the particular operation is not able to be carried out). Other examples of data handling transactions might include, for example, invalidation transactions in which a cached copy of a data item held at one device is invalidated.

The transactions 112 are issued to the SMMU 130 which then provides them as transactions 132 to the downstream device(s). The SMMU receives responses 134 which it provides back as the responses 114 to the relevant upstream device. The reason for using an SMMU will be discussed below.

The downstream device(s) 120 may include, for example, a main memory system, one or more interconnects, a higher level cache memory (where "higher" is with reference to the level in a cache hierarchy of any cache memories held at the upstream device(s) 110) or the like. In general, the downstream device(s) 120 acts as transaction "slave" devices in that they generally do not initiate data handling transactions themselves but instead responds to data handling transactions initiated by the upstream devices 110.

Address Translation—Overview

The SMMU 130 provides so-called address translation functions.

In the arrangement of FIG. 1, address translation is used so that the address space or spaces accessed by the upstream devices 110 are not necessarily the same at the physical address spaces used to access memory storage at the downstream devices 120. One reason for using this type of arrangement is to allow different processing elements, operating systems, applications or other functions to have access to respective address spaces, in order to avoid security issues. For example, if one application simply cannot access the address space associated with another application, the risk of malicious code or malfunctioning code doing damage to data held by a different application is reduced.

In some examples, the upstream devices operate according to a virtual address scheme within a virtual address space and this is translated by the SMMU into corresponding physical addresses within a physical address space. In other examples, not shown in FIG. 1, an intermediate stage of translation is provided, so that the virtual address (VA) is first translated to an intermediate physical address (IPA) which in turn is translated into the physical address (PA). However, the example in FIG. 1 simply makes use of a VA-PA translation, though corresponding techniques may be applied to one or both of a VA to IPA translation and an IPA to PA translation.

An incoming data handling transaction 112 is provided to a translation buffer unit (TBU) 140 which translates any VAs associated with the transaction into corresponding PAs and outputs the transaction 132 to the relevant downstream device 120. Similarly, the TBU handles routing of any responses 134 and, if necessary, their translation from the PA space to the VA space for output 114 to the relevant upstream device.

As part of its operation, the TBU 140 may interact with a translation control unit (TCU) 150 which in turn may interact with a main memory via or at one of the downstream devices 120.

Some aspects of the operation of the arrangement of FIG. 1 will now be described with reference to FIGS. 2 and 3.

Figure 2:
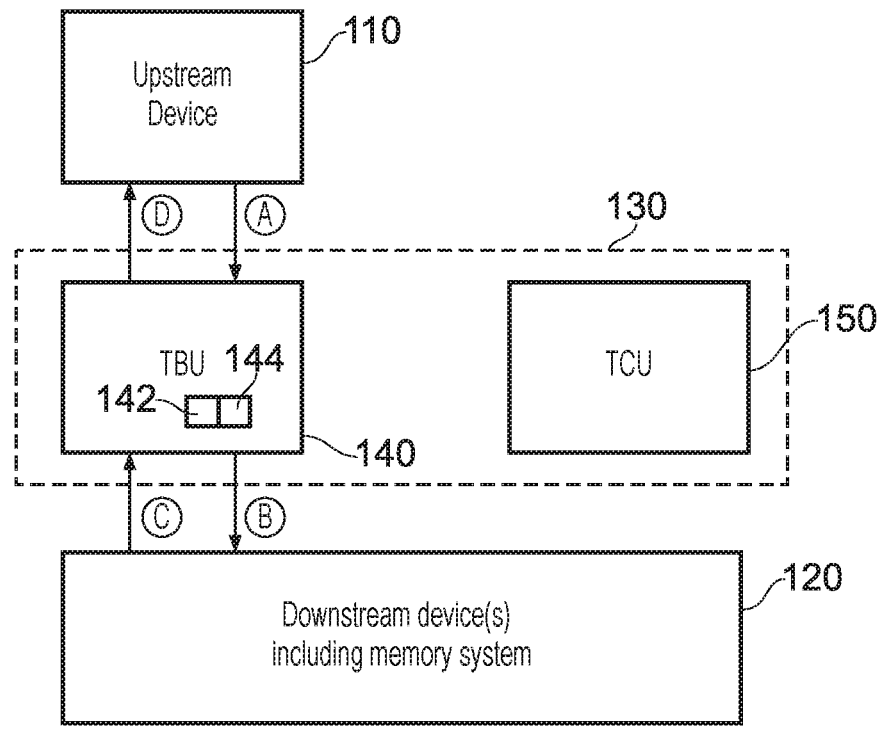
FIGS. 2 and 3 schematically illustrate data flow in the circuitry of FIG. 1.
Figure 3:
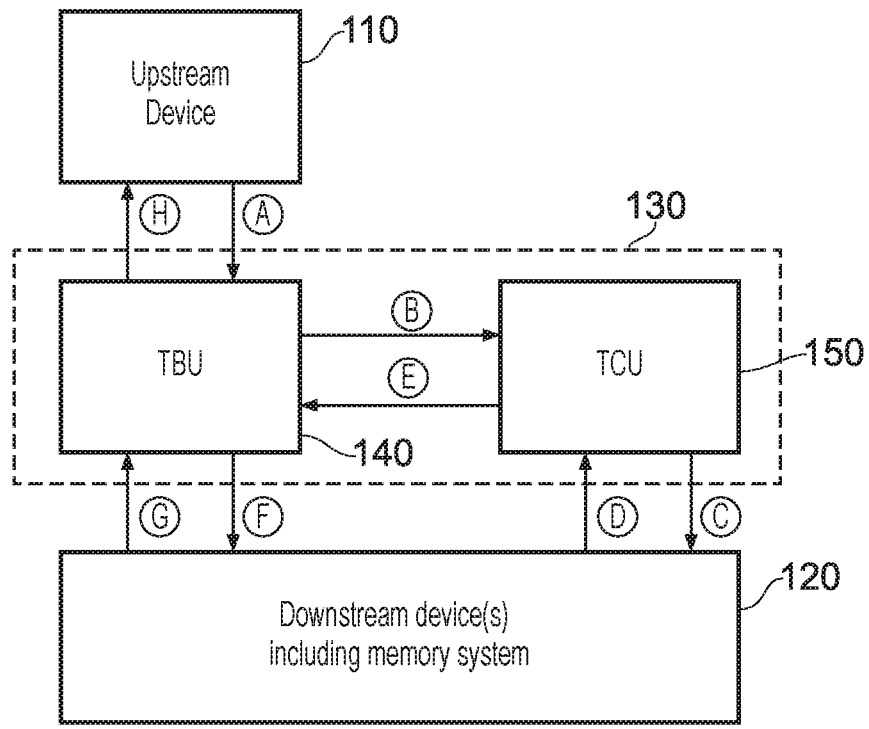

In FIGS. 2 and 3, the routing of transaction information and responses, along with other data in the case of FIG. 3, is shown by a series of ordered arrows annotated with consecutive letters from A . . . upwards. The alphabetical order indicates the schematic ordering of the steps as shown.

The TBU 140 is configured to store a cached copy of information required to translate at least some incoming memory addresses in the VA space. FIG. 2 schematically represents the situation when a suitable copy is indeed cached at the TBU 140.

Referring to FIG. 2, a transaction is initiated by an upstream device 110 and is sent (A) to the TBU 140. The transaction refers to at least one VA. In this example, the TBU 140 has a cached copy of sufficient information to translate the VA into a PA and forward the transaction (B) with the PA information to the downstream devices 120. A response (or more than one response) is provided (C) by the downstream device in question and the TBU 140 provides translation if needed in order to provide a suitable response (D) to the upstream device which initiated the transaction. The TCU is not involved in the data flow of FIG. 2.

However, in FIG. 3, the TBU 140 does not currently hold a copy of the relevant data to translate the incoming PA into a VA, so another system has to be invoked.

Once again, an upstream device 110 issues a transaction (A) to the TBU 140 the TBU checks its internal caches and finds that the translation information from the VA(s) specified by the transaction is not currently held by the TBU. The TBU therefore issues a request (B) to the TCU to obtain the relevant translation information. The TCU consults memory 120 (C), for example by conducting a so-called page table walk. This may involve multiple consultations of memory during the process of completing the page table walk but ultimately the TCU 150 will receive sufficient information (D) to fulfil the translation required by the TCU. The TCU forwards this information (E) to the TBU.

In response to the receipt of the translation information (E) from the TCU, the TBU stores this information in its own cache and services the translation of the original transaction (A) from the cached copy. Once the translation has been performed, the TBU is then free to issue the transaction with the relevant PA in place (F) to the downstream devices 120 and to handle any responses (G) as before, forwarding them back to the upstream device (H).

In general terms, the process of FIG. 2 is likely to be somewhat faster than that of FIG. 3. The cache held at the TBU may comprise one or more cache portions in a hierarchy, for example with a smallest but fastest cache being referred to as a micro-TLB or µTLB 142, where "TLB" stands for "translation lookaside buffer". The µTLB may have a response latency to provide a translation, if that translation is already stored at the µTLB, of perhaps one or a few clock cycles. In addition, a larger but slower TLB, for example referred to as a "main" TLB 144 may be provided. The main TLB might have an access latency of perhaps a few tens of clock cycles. In contrast, sending a request (B) to the TCU as shown in FIG. 3 can involves a much greater latency. Typically, for a TCU to consult page tables in a main memory can take several hundred clock cycles.

Example embodiments to be discussed further below aim to assist with the coordination of requests from the TBU to the TCU and to coordinate the handling of translation tasks by the TCU, notwithstanding the long period of time which they may take to service, and where possible to reduce the amount of requests and data traffic from the TBU to the TCU and/or between the TCU and memory.

Therefore, in these examples, a data handling transaction to be overseen by the hazard cache/list circuitry is an address translation transaction to request a translation of an input memory address in an input memory address space to an output memory address in an output memory address space. In the examples being discussed the input memory address is a virtual memory address; the input memory address space is a virtual memory address space; the output memory address is a physical address; and the output memory address space is a physical address space. In other examples involving individual stage(s) of a two-stage memory address translation either the input memory address is a virtual memory address; the input memory address space is a virtual memory address space; the output memory address is an intermediate physical address; and the output memory address space is an intermediate physical address space; or the input memory address is an intermediate physical memory address; the input memory address space is an intermediate physical memory address space; the output memory address is a physical address; and the output memory address space is a physical address space.

TBU and TCU

Figure 4A:
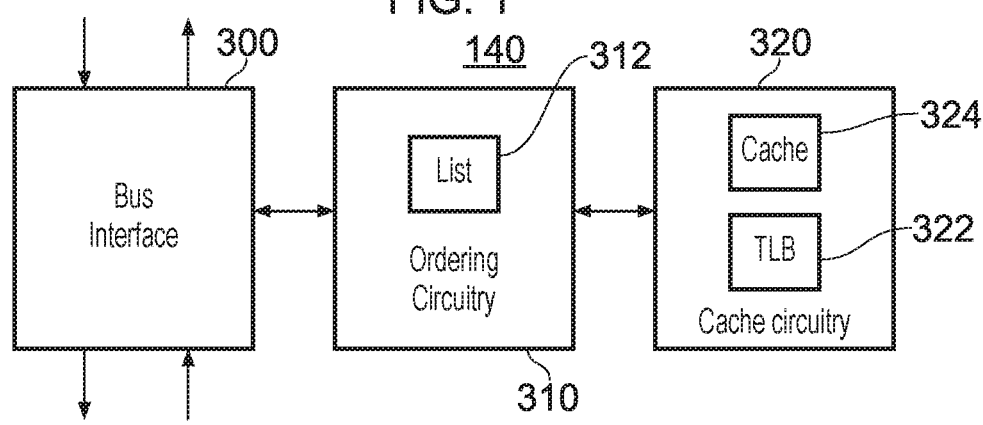
FIG. 4*a* schematically illustrates a translation buffer unit (TBU)

FIG. 4a schematically illustrates some aspects of the TBU 140, which includes a bus interface 300, ordering circuitry 310 to initiate and order translation requests for handling by the TBU and/or the TCU, and cache circuitry 320 including the TLB(s) 322.

The ordering circuitry 310 may provide the functionality of maintaining a so-called hazard list 312 and the cache circuitry may provide the functionality of maintaining a so-called hazard cache 324. The hazard list and hazard cache will be discussed in more detail below.

Note that in some other examples, at least a part of the functionality of the TBU 140 may be distributed and provided at or in association with each of the upstream devices 110.

Figure 4B:
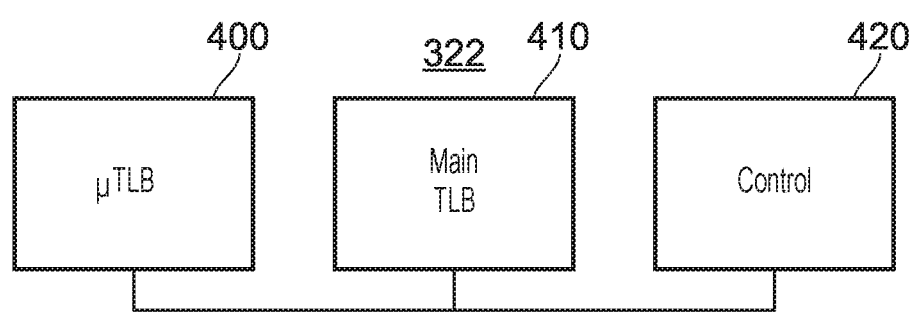
FIG. 4*b* schematically illustrates a translation lookaside buffer (TLB) arrangement.

FIG. 4b schematically illustrates the TLB 322, which, as discussed above, may provide a smaller but faster µTLB 400, a slower but larger main TLB 410 and control circuitry 420 to control accesses to and updating of the TLB 322.

Figure 5:
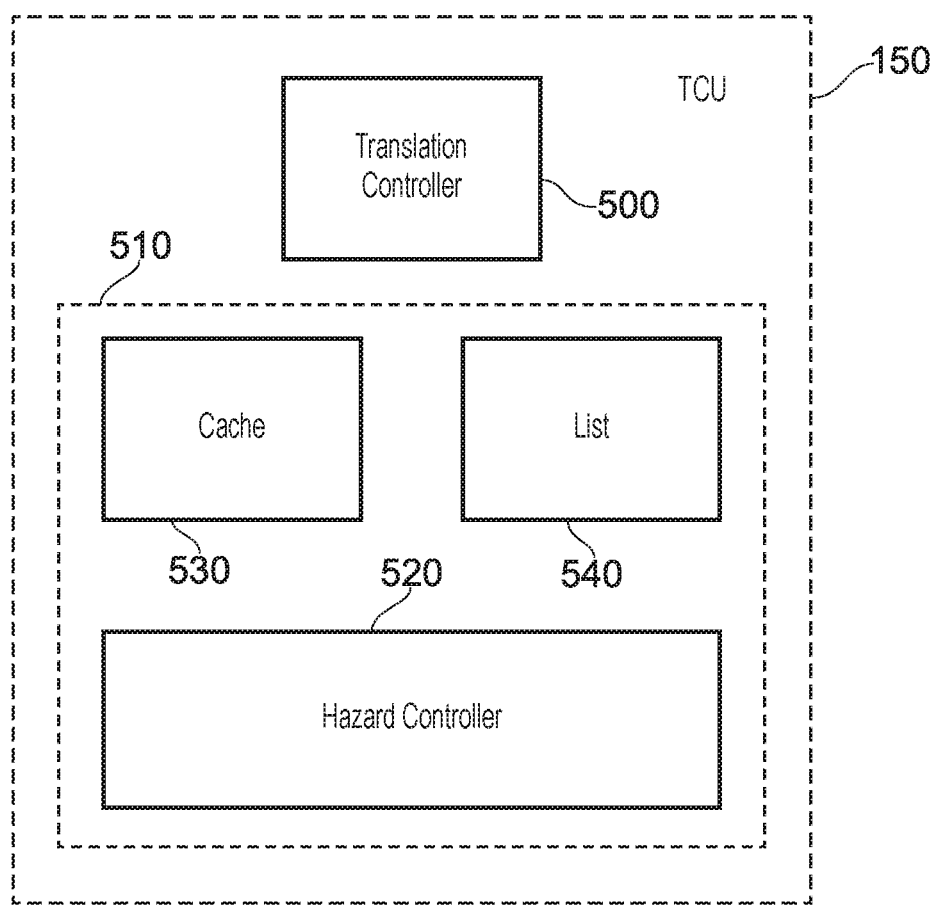
FIG. 5 schematically illustrates a translation control unit (TCU)

FIG. 5 schematically illustrates some aspects of the TCU 150, which includes a translation controller 500 to oversee the handling of translation requests from the TBU and the access to page tables or other data held in memory, and a hazard system 510 including a hazard controller 520, a hazard cache 530 and a hazard list 540.

Therefore, it will be seen that the TBU provides a hazard list 312 and a hazard cache 324 and the TCU also provides a hazard list 540 and a hazard cache 530. These provide similar overall functions but in respect of different aspects of the handling of translations by the SMMU 130.

The similarity in function relates to the fact that each set of (hazard list, hazard cache) circuitry handles translation transactions to be sent to a next stage in the processing. That is to say, the hazard list and hazard cache held by the TBU refer to translation requests sent to the TCU. The hazard list and hazard cache held by the TCU referred to translations to be implemented via access to the downstream devices including memory, for example by the so-called page table walk arrangement. Aspects which are similar as between the operation of the two arrangements will be described with reference to FIGS. 6-9.

These arrangements therefore provide an example of memory address translation circuitry 130 comprising circuitry 312, 324; an address translation buffer 322 to store data defining one or more memory address translations; transaction source circuitry 310 to issue a data handling transaction to further circuitry 150 in the case that a required memory address translation is not provided by data currently held in the address translation buffer, the transaction source circuitry being configured to receive data defining the required memory address translation as a resolution of the data handling transaction. In example embodiments the memory address translation circuitry 130 also comprises the further circuitry 150; in which the further circuitry is configured to interact with a data memory 120 and to issue, as a further data handling transaction, a transaction to obtain data defining the required memory address translation from information stored in the data memory; the further circuitry comprising a further instance of the circuitry 520, 530, 540, the further instance being configured to control handling of the further data handling transaction.

Transaction Handling with Hazard Cache and List

Figure 6:
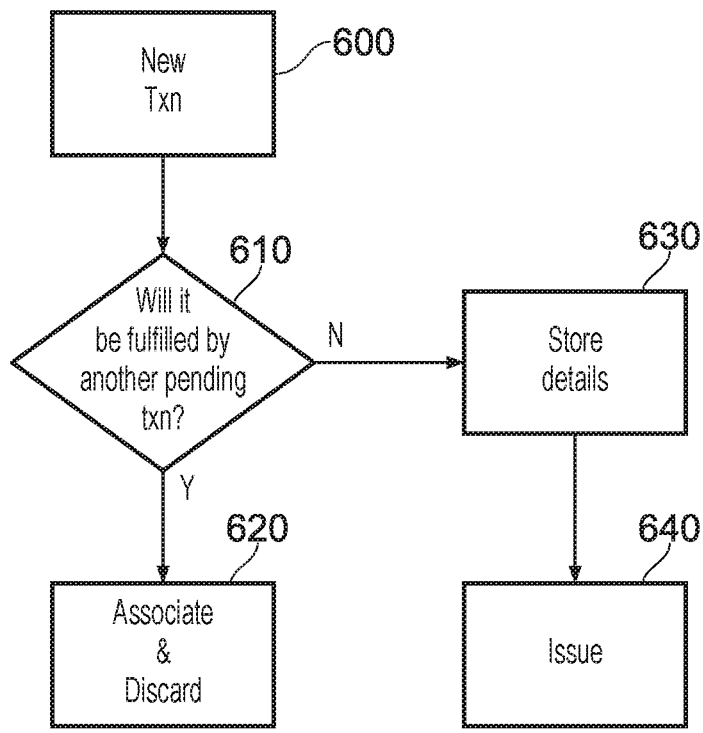
FIGS. 6 and 8 are schematic flowcharts illustrating respective methods.

FIG. 6 is a simplified schematic flowchart illustrating operations when a new transaction (Txn) is to be handled 600, for example (a) a transaction relating to an address translation not found in the TLB 322 at the TBU 140 (or at least not found within the μTLB 400) and so to be issued by the TBU to the TCU, or (b) a translation transaction to be issued by the TCU 150 for resolution by consultation of main memory or the like. Note that although these examples relate to address translation transactions, the same techniques can be applied to other types of data handling transaction such as those listed as examples above.

At a step 610, a detection is made as to whether the new transaction would actually be fulfilled by the resolution of any existing transaction in the system, or at least by any transaction for which at least some details are recorded in the hazard list and/or hazard cache. In some example embodiments, this detection is made by detecting whether an entry exists in the relevant hazard cache having attributes corresponding to the new transaction 600. If the answer is yes then control passes to a step 620 at which the new transaction is associated with the other pending transaction to perform or add to a list such as for example (though not exclusively) a linked list. At that point, the new transaction 600 can in fact be discarded because its resolution will be provided by resolution of the already pending transaction.

If however the answer at the step 610 is no, then at a step 630 data is stored, for example as an entry in the relevant hazard cache, providing properties or attributes of the new translation 600 which can then be compared with further subsequent incoming transactions. At a step 640, the new transaction is issued, or queued for issue (in other words, issue being at least initiated), or otherwise progressed towards resolution by the following stage of processing.

The attributes or properties discussed above may include for example the address or address range to be translated, optionally with other properties of the required action, and optionally an identifier of the transaction itself. In some example embodiments, the step 610 may include a check not only of the hazard cache but also of the hazard list, or in other embodiments the check could be of the hazard list only. Indeed, in some examples, a hazard cache is not actually required; the relevant information could be maintained in a single hazard list.

Figure 7:
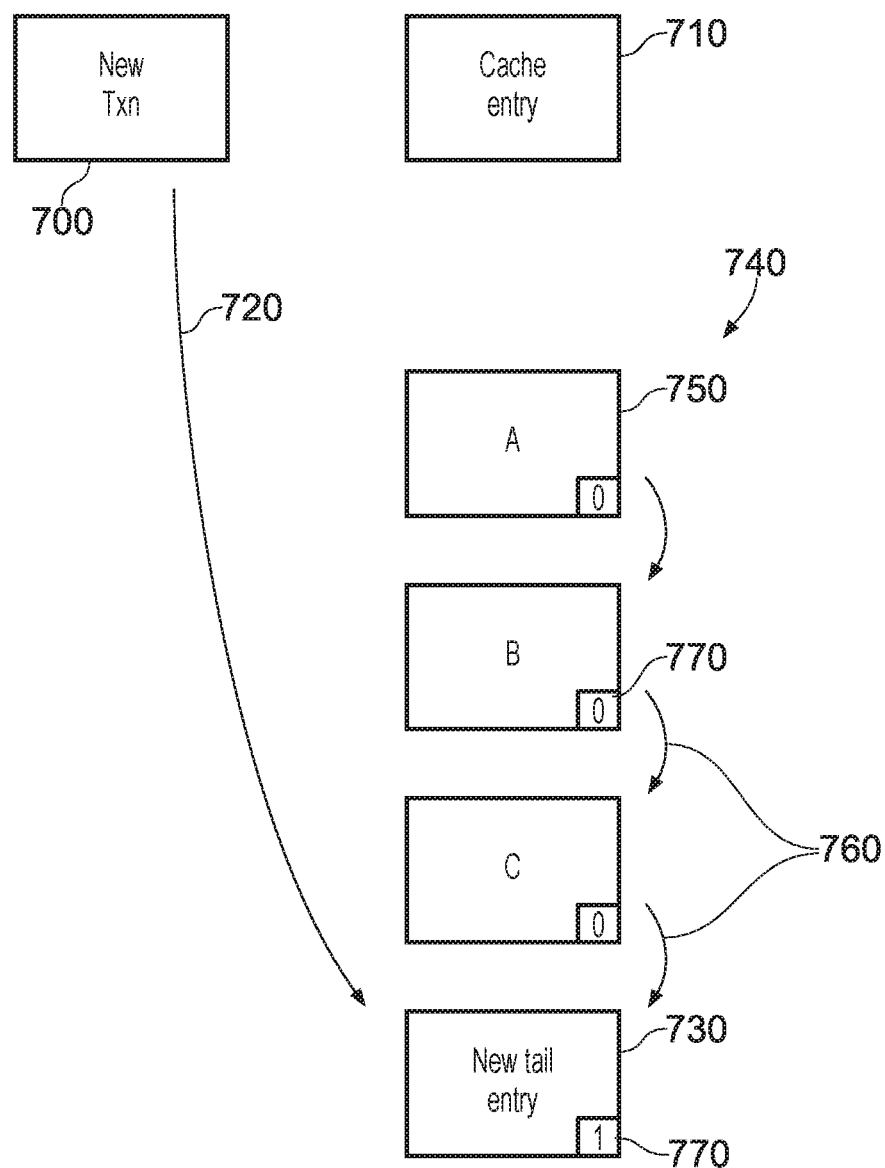
FIGS. 7 and 9 schematically illustrate aspects of transaction handling.

At this overview level, reference is also made to FIG. 7. Here, a new transaction as discussed above 700 is compared with entries in the hazard cache to see whether a cache entry exists having attributes (such as an address range to be translated) corresponding to those of the new transactions 700 such that the new transaction would be fulfilled by fulfilment of the transaction for which the cache entry was made. Assuming that such a cache entry 710 is found (the "yes" outcome of the step 610 in FIG. 6) then the new transaction is added 720 as a new tail or final entry 730 to a linked list 740 of translation transactions. Here, the head or first entry 750 in the link list (a translation transaction A) was a transaction for which the cache entry 710 was first created. Subsequently added transactions 700 are B and C, with the latest new transaction 700 being added as the new tail entry 730. This provides an example in which the control circuitry 1010 is configured to associate the given data handling transaction with the respective entry in the attribute storage circuitry as a new last item in the linked list of data handling transactions associated with that entry in the attribute storage circuitry when the comparator circuitry detects that the given data handling transaction would be fulfilled by the data handling transaction for which attribute data is held by the respective entry in the attribute storage circuitry.

In the negative outcome of the step 610, a cache entry 710 corresponding to the new transaction would be created, evicting (if necessary) a previously held cache entry according to an eviction policy. Optionally at this stage a new (single item) list could be established, or the establishment of a list could be deferred until there are at least two items to be included in the list. The latter outcome provides an example in which the control circuitry 1010 is configured, when the comparator circuitry detects that the given data handling transaction would not be fulfilled by the data handling transaction for which attribute data is held by any entry in the attribute storage circuitry, to create a new linked list having the given data handling transaction as a head list item.

Although the examples are of a linked list (which can make the traversal of the list at a subsequent resolution stage more straightforward or convenient) the list could be a non-ordered list of heap of associated transactions.

In the case of an ordered or linked list, each item in the list may optionally be associated with a pointer (represented schematically as arrows 760 in FIG. 7) to a next list item. Each item in the list may optionally be associated with a "tail flag" or "tail indicator" 770 which is, in effect, an indicator of whether a pointer to a next item is valid or not (given that the tail or final list item will not have a valid next-item pointer). In the example shown, the tail flag is 0 for an item which is not last in the list, and is 1 for the last item in the list.

Whenever a new transaction is identified which does not have a corresponding cache entry already, that transaction is issued, or queued for issue for resolution. So, in the example of FIG. 7, the transaction A 750 would have been issued or queued for resolution.

Figure 8:
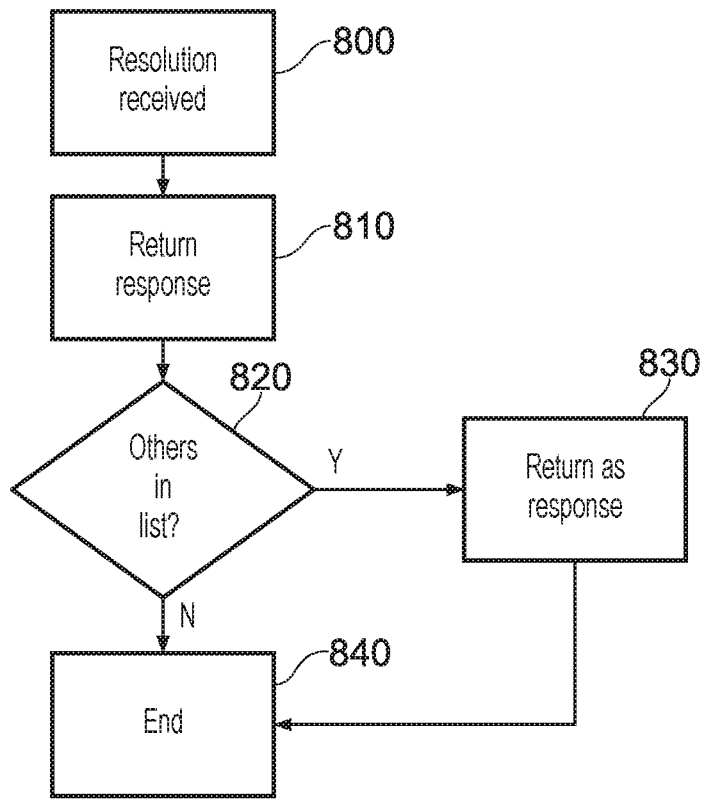

Referring to FIG. 8, resolution to a pending transaction is received at a step 800. In the case of translations issued by the TBU to the TCU (and so being relevant to the hazard list 312 and the hazard list 324) the step 800 refers to the resolution being provided back from the TCU to the TBU. In the case of transactions issued by the TCU for resolution by consultation of memory (via the translation controller 500) the step 800 corresponds to the completion of the page table walk and the generation of the resolution of the translation to be passed back to the TBU.

The resolution is identified by a transaction identifier (the identifier of the transaction launched or issued for resolution) and so the response to that transaction defined by that particular identifier can be returned at a step 810.

At a step 820, a detection is made as to whether there are any other translation transactions in a list (or a linked list of the type shown in FIG. 7) which were identified earlier as being fulfilled by the resolution of the original transaction and which are therefore associated as a set of transactions. If the answer is yes then control passes to a step 830 where they are completed by returning the response received at the step 800 as though they were a response or resolution of those listed associated transactions. This process can be carried out on a cycle by cycle or other basis, and can be referred to as "unwinding" the list. Control then passes to a step 840 at which the handling of that particular resolution ends. The negative outcome from the step 820 also passes to the step 840.

Figure 9:
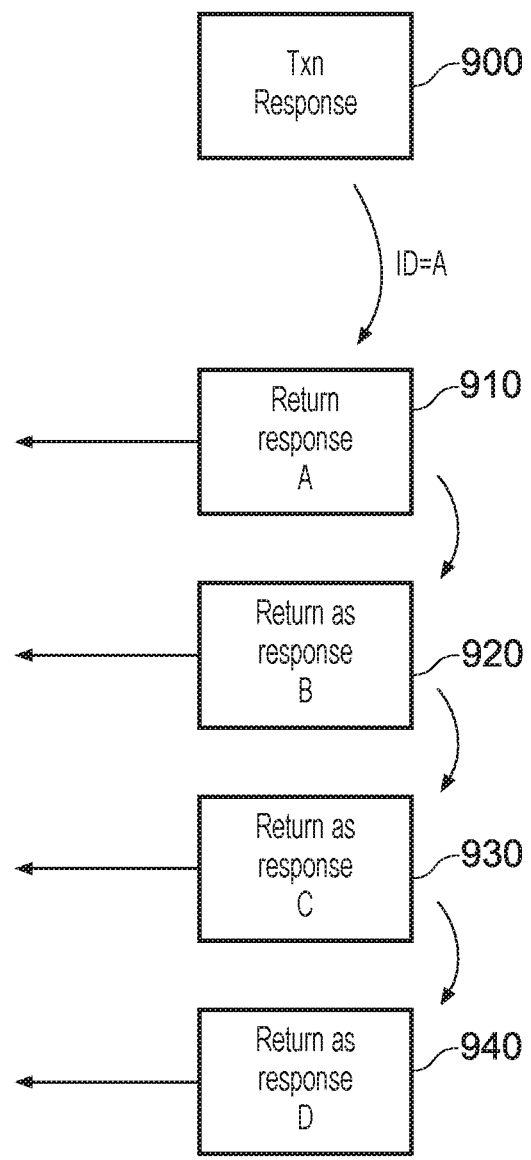

Referring to FIG. 9, assuming that a transaction response 900 is received (at the step 800) having an ID for a transaction A which was the head item in the list of FIG. 7, then at the step 810 the response to the transaction A is returned 910.

In the list of FIG. 7, there were other transactions B, C and (the new transaction received in FIG. 7 D). At the step 830, the transaction response 900 is returned as though a response to the transactions B 920, C 930 and D 940, for example in successive clock cycles.

Therefore, it can be seen that each of the transactions in the list has been serviced and a resolution or response provided but at the cost of handling only the head transaction in the list, with the other transactions being serviced by re-using the response generator for the head transaction in the list. This can improve efficiency of operation of one or both of the TBU and TCU in FIG. 1, for example by reducing the number of translations which have to be resolved by a subsequent stage, by reducing data traffic between the TBU, TCU and memory, and by reducing the overall workload of the TCU and/or memory.

In the case of a list or set other than a linked list, any one of the transactions in the set could be sent for resolution and, in response to that resolution, a response provided for others in the set. In other examples, more than one in the set could be issued for resolution and, for example in response to the first one being successfully resolved, responses issued for some or all of the others (perhaps with any not-yet-fulfilled transactions being cancelled at that stage).

Figure 10:
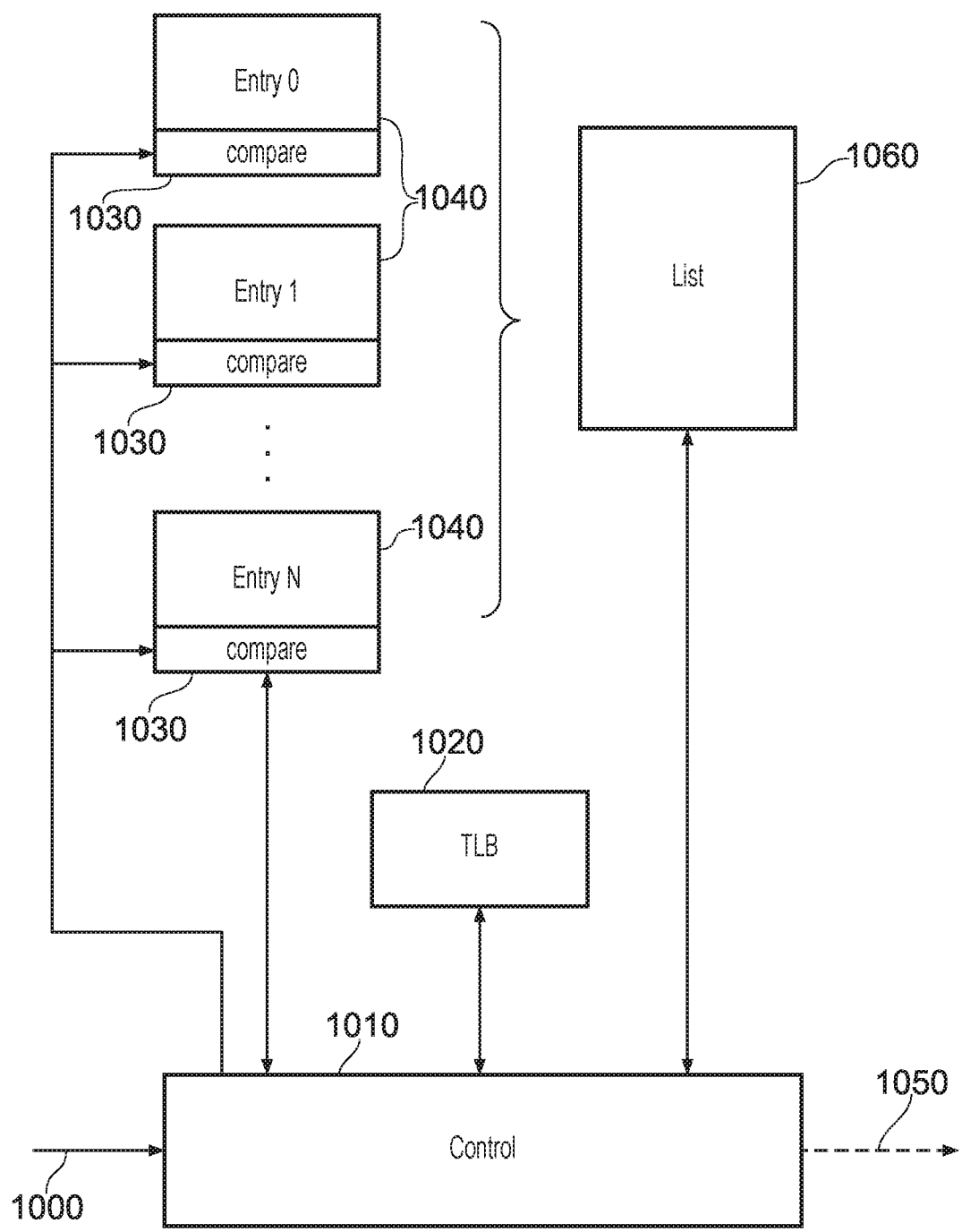
FIGS. 10 and 11 schematically illustrate hazard cache and hazard list circuitry.

FIG. 10 schematically illustrates an overview of some structural aspects of the hazard cache and the hazard list for either or both of the TBU and the TCU as discussed above. In FIG. 10, operations relating to FIGS. 6 and 7 (the input of a new transaction) are shown. The incoming transaction 1000 is provided to control circuitry 1010 (which may be provided as distributed control circuitry having portions handling the hazard cache and the hazard list respectively). In the case of the TBU, the control circuitry is configured to consult the TLB 1020 and, potentially in parallel to compare attributes of the incoming transaction 1000 using comparator circuitry 1030 with each entry, entry 0 . . . entry N 1040 in the hazard cache.

If the required translation is found in the μTLB 400 then the control circuitry 1010 ends the processing there. The translation obtained from the μTLB 400 is returned as the response to the transaction 1000.

So, in the example embodiment, the following processing occurs only when the required translation was not found in the μTLB 400. In other words, the processing can be initiated during a search of the main TLB 410, and can (if appropriate) be aborted if a resolution is indeed found in the main TLB.

The comparison by the comparator circuitry 1030 provides the functionality of the step 610 of FIG. 6. Are the attributes of the new transaction such that on comparison with attributes stored in the cached entries 1040, the new transaction would be fulfilled by the fulfilment of any transaction for which a cache entry is held. If the answer to this is yes, then the control circuitry 1010 generates control signals to "append" the new transaction to a list associated with the matching one of the cache entries if the answer is no then the control circuitry 1010 generates control signals to create a new list and a new cache entry. Note that the control circuitry 1010 can operate a replacement policy so that a cache entry to be deleted in order to make space (if necessary) for the cache entry relating to the new transaction 1000 is selected according to that policy.

In parallel with these operations, the control circuitry 1010 oversees a check of the main TLB 410, noting that this can be somewhat slower than a check of the μTLB 400.

The generation of a "create" operation and the absence of the relevant translation in the main TLB gives rise to the control circuitry 1010 controlling the issue 1050 of the transaction (or at least the queuing for issue) for resolution by a next stage of processing such as the TCU. The generation of an append operation causes the control circuitry 1010 to drop or discard the transaction, in the sense that the transaction is not issued for resolution.

In response to the "create" or "append" operations, amendments may be made to the hazard list 1060, either to initiate a new list or to add the transaction 1000 as a new tail entry to an existing list. In a second embodiment to be discussed below, the list is not amended until displacement of an existing entry in the cache.

The hazard list 1060 may be stored by a list memory to store data defining at least those of the set of associated data handling transactions which are not currently held by the attribute memory.

FIG. 10 therefore provides an example of circuitry comprising:

attribute storage circuitry 1040 having a plurality of entries to hold data defining at least a transaction attribute of one or more respective data handling transactions initiated by transaction source circuitry 110;

comparator circuitry 1010,1030 to compare a transaction attribute of a given data handling transaction with data held by the attribute storage circuitry to detect whether the given data handling transaction would be resolved by any data handling transaction for which attribute data is held by a respective entry in the attribute storage circuitry; and control circuitry 1010 to associate the given data handling transaction with the respective entry in the attribute storage circuitry to form a set of associated data handling transactions when the comparator circuitry detects that the given data handling transaction would be fulfilled by the data handling transaction for which attribute data is held by the respective entry in the attribute storage circuitry;

the control circuitry 1010 comprising output circuitry 1012 (below) responsive to a resolution of a data handling transaction in the set of associated data handling transactions, to provide that resolution to the transaction source circuitry as a resolution of each of the set of associated transactions.

In other words, as drawn in FIG. 10, the control circuitry has the functionality of overseeing the populating of the hazard cache and the hazard list and also (as discussed below with reference to FIG. 11) of outputting transaction responses as described above.

Figure 11:
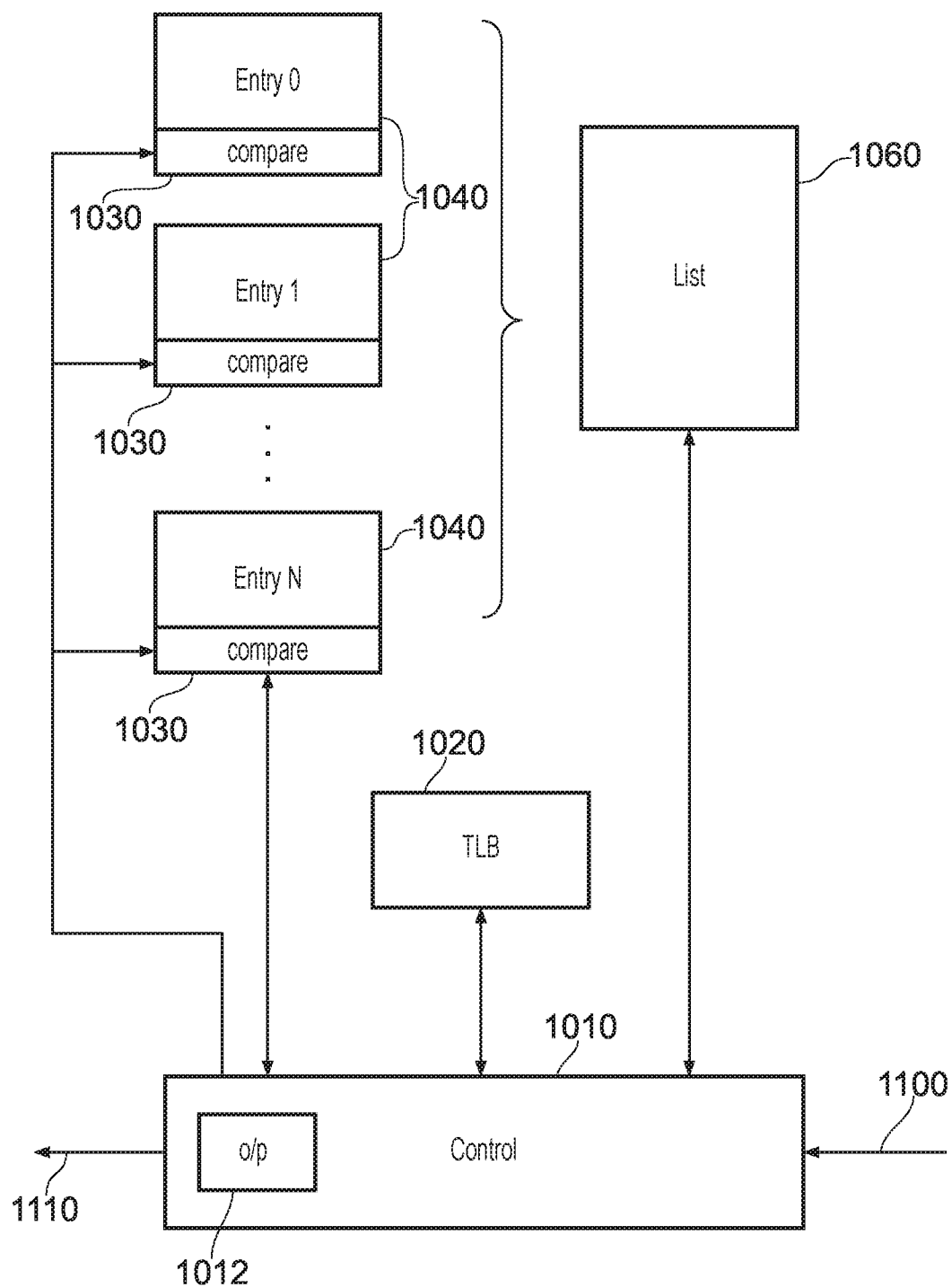

Referring to FIG. 11, in the case of an incoming resolution 1100 of a translation transaction the control circuitry 1010 again controls a comparison with the list 1060 and/or the entries 1040 in the hazard cache so as to detect which other transactions (if any) needs to have that resolution issued as though it were a response to that other transaction. Output circuitry 1012 of the control circuitry 1010 controls the issue 1110 of transaction responses to all of the relevant transactions and also the writing of the newly received translation to at least the μTLB 400 in the TLB 420.

With regard to the operational structure of the hazard list and hazard cache, two example embodiments will now be described.

First Example Embodiment

In the first embodiment the control circuitry 1010 is configured to store data defining a data handling transaction in the list memory in response to creation of an entry in the attribute memory for that data handling transaction.

Figure 12:
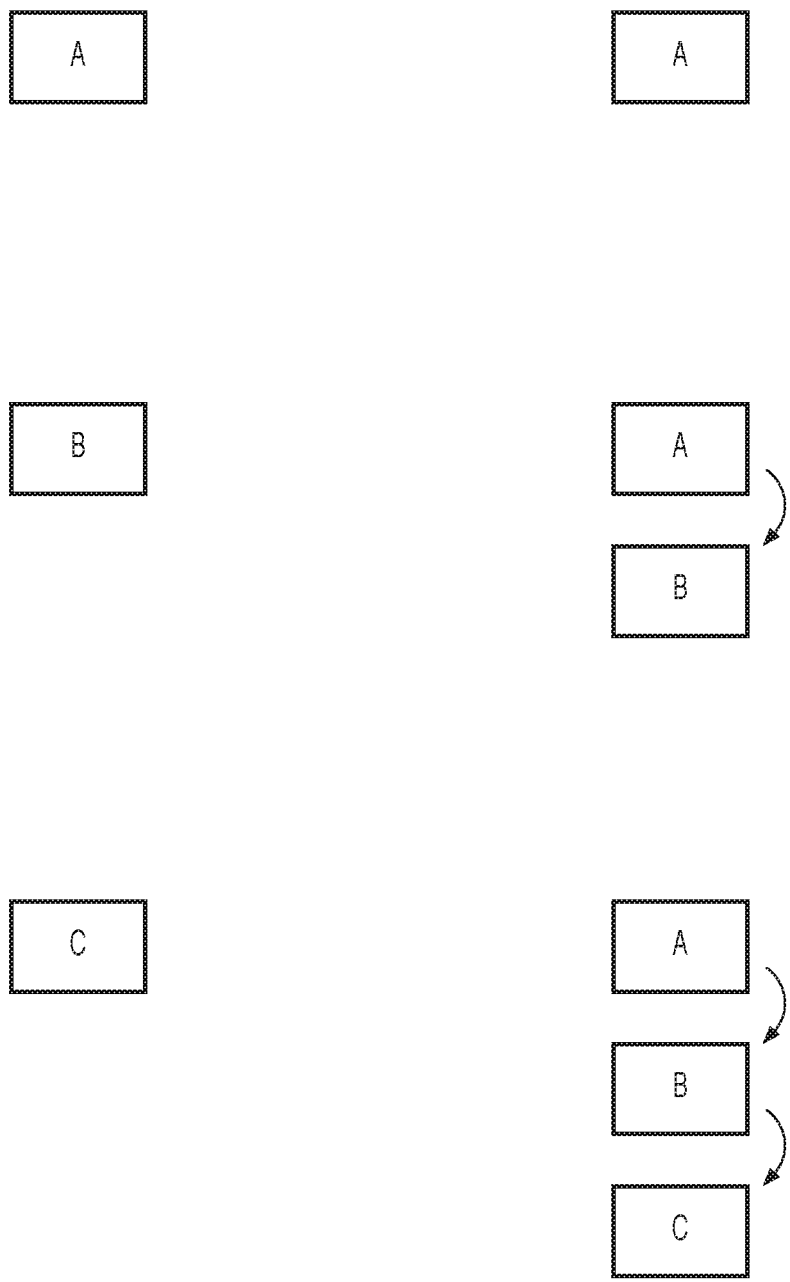
FIG. 12 schematically illustrates a set of transactions.

Referring to FIG. 12, assume that a new transaction A is received (left hand side of FIG. 12 as drawn) and the comparator circuitry 1030 does not find any match amongst the existing cache entries relating to a valid cache entry. In this example a list is initiated (right hand side of FIG. 12 as drawn) having just one entry, the transaction A, and a cache entry having attributes of the transaction A is also generated to allow a set of associated transactions to be developed from it. The initiation of the new cache entry provides an example of the control circuitry 1010 being configured, when the comparator circuitry detects that the given data handling transaction would not be fulfilled by the data handling transaction for which attribute data is held by any entry in the attribute storage circuitry, to generate, from the given data handling circuitry, an entry for storage by the attribute storage circuitry.

These operations performed with respect to the newly received transaction A provide an example in which the given data handling transaction (which is compared with the hazard cache and handled as described) is a data handling transaction most recently initiated by the transaction source circuitry.

The transaction B is found to be such that it would be fulfilled by resolution of the transaction A and so is added as a new tail item to the list.

Similarly, the transaction C is found to be such that it would be fulfilled by resolution of the transaction A and so is added as a new tail item to the list.

Figure 13:
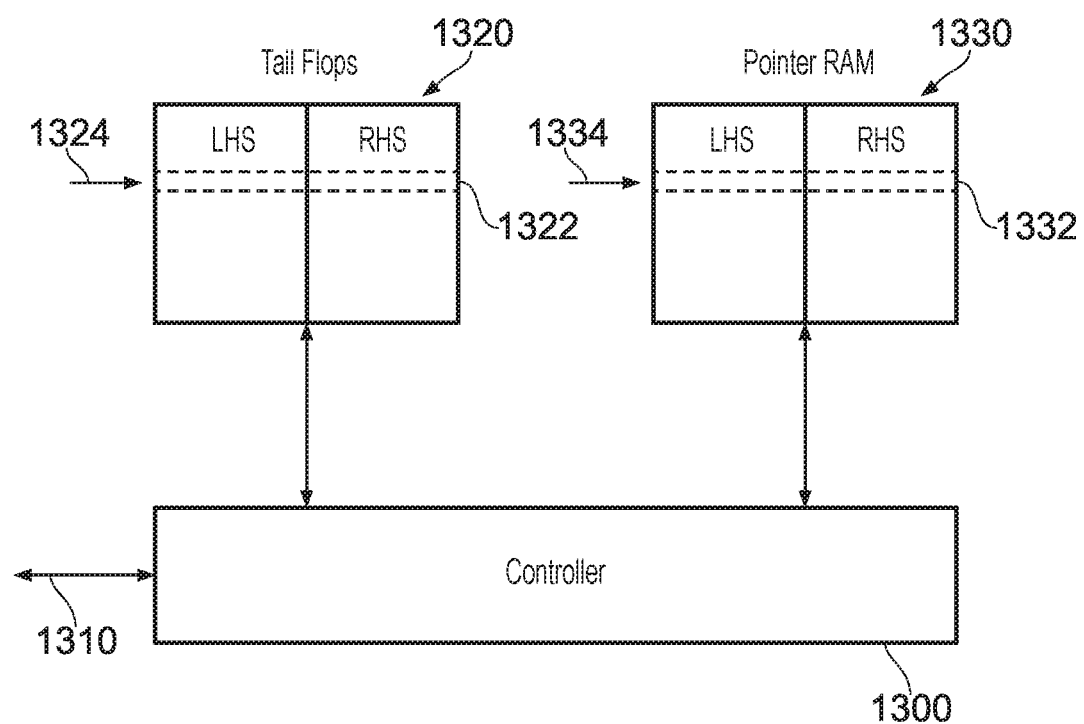
FIG. 13 schematically illustrates an example of hazard list circuitry.

FIG. 13 schematically illustrates an example logical structure of hazard list circuitry according to the first embodiment. A controller 1300 interacts (via signals 1310) with the hazard cache circuitry (for example forming part of the controller 1010, interacting with another portion of the controller 1010 associated with the hazard cache circuitry).

A set of "tail flops" 1320 comprises a number of entries 1322 each having a logical left-hand side (LHS) and right-hand side (RHS). Here and elsewhere in this description, the expressions "left" and "right" refer to convenient logical designations of respective portions of a commonly-addressed storage entry and do not imply any aspect of physical or circuitry layout.

The use of the LHS and RHS in the first or the second example embodiments provides an example in which the list memory is configured to store, as a single entry in the list memory, data defining two or more data handling transactions.

In FIG. 13 the entries are shown as horizontally-drawn sections and are addressable 1324 by transaction identifier. The tail flops 1320 are implemented as "flops", otherwise referred to as "flip-flops" and store (in this example) one bit for each of the LHS and RHS of each entry 1322. Flops are used because (a) they provide low latency and in some examples parallel access; and (b) the amount of data to be stored (a total of two bits for each entry) is relatively low so that the circuitry overhead of using flops rather than RAM entries is also relatively low. The tail flops 1320 store information indicating a "tail item" status, which is to say an indicator of whether a particular item in a linked list of items forming the hazard list as discussed above is the final or tail item in that linked list.

A pointer RAM 1330 is also arranged as a plurality of entries 1332 each addressable 1334 by transaction identifier and each having an LHS and an RHS. Typically the pointer RAM 1330 is implemented as RAM (for example SRAM), but could instead be implemented by flops if the number of pointers to be stored makes this a practical design decision. The pointer RAM 1330 provides pointers to next items in the linked list forming the hazard list discussed above.

The addressing of the tail flops 1320 and the pointer RAM 1330 by transaction identifier implies that in at least example embodiments, there will be one list "entry" in each of the tail flops 1320 and the pointer RAM 1330 for each possible value of the transaction identifier. For example, if the transaction identifiers have valid and usable values between 0 and 7 (decimal) then each of the tail flops 1320 and the pointer RAM 1330 would provide eight entries (each having an LHS and an RHS) indexed by transaction ID between 0 and 7.

A purpose of the LHS and RHS is to store, in effect, information relating to two linked list items in a single entry 1322, 1332. This allows the information relating to the multiple items to be retrieved in a single read operation and, in a practical circuitry implementation, can avoid the use of so-called RAM-to-RAM loops, which can be undesirable for timing purposes and also for diagnostic and other confidence testing of circuitry designs.

The operation of this example embodiment will now be described with reference to FIGS. 12 and 13. In this example, three successively received transactions are denoted by A, B and C. Assume for the purposes of this discussion that the parameters or attributes of the transactions (for example, address ranges in a VA space to be translated) are such that each of the transactions B and C would be fulfilled by the resolution of the transaction A. Therefore, in the example embodiments, the hazard cache and hazard list are used to associate the transactions A, B and C together, which in these examples represents linking the three transactions into a linked list.

Assume for the purposes of the example that the three transactions are associated with transaction identifiers as follows:

| Transaction | Transaction Identifier (TxnID) |
|---|---|
| A | 0 |
| B | 2 |
| C | 4 |

Transaction A is Received

At the receipt of the transaction A, assume that no previously received transaction for which an entry is currently held in the hazard cache is such that the transaction A would be fulfilled by servicing of that previously received transaction. In other words, the comparisons performed by the comparators 1030 do not obtain a match. The actions taken by the controller 1010 therefore include: (a) establishing a new entry in the hazard cache with TxnID=head ID=0 and validity=valid; and (b) issuing a "create" message to the hazard list and the controller 1300. As mentioned above, the issuing of the "create" message initiates the issuing (or at least the queueing for issue) of the transaction A for fulfilment by next-stage circuitry. This provides an example in which the control circuitry 1010 is configured, when the comparator circuitry detects that the given data handling transaction would not be fulfilled by the data handling transaction for which attribute data is held by any entry in the attribute storage circuitry, to initiate issue of the given transaction for resolution.

At the hazard list, the response to the "create" message is to set the tail flag in the LHS of the tail flop entry addressed by TxnID=0. Effectively, this indicates that the transaction A (TxnID=0) is currently both the head and the tail of a single-item linked list. No pointers are set in the pointer RAM 1330 at this stage because there is no subsequent item in the linked list.

This arrangement provides an example in which the list memory comprises entries addressable by a transaction identifier of a data handling transaction in the set of associated data handling transactions.

Transaction B is Received

Here, a match is obtained by the comparators 1030 indicating that the hazard cache entry relating to the transaction A is held in the hazard cache and that the transaction B would be fulfilled by the fulfilment of the transaction A. The action taken by the controller 1010 therefore includes issuing an "append" message to the hazard list and the controller 1300. As mentioned above, the issuing of the "append" message initiates the dropping or discarding of the transaction B such that the transaction B is not issued or queued for issue for fulfilment by the next-stage circuitry.

At the hazard list, the response to the "append" message is as follows:

The tail flops are again accessed at the entry addressed by the transaction identifier of the transaction A (because only the LHS of that entry has been occupied so far). The tail indicator at the LHS of that entry is set to 0 (indicating in this example that the first item in the linked list is "not a tail") but the tail indicator at the RHS of that entry is set to 1 (indicating that the second item in the linked list is the "tail" of the linked list).

The pointer RAM 1330 is also accessed at the entry addressed by the transaction identifier of the transaction A and, at the LHS of that entry, a pointer which identifies the transaction B (in other words, a pointer to the TxnID=2) is inserted.

Transaction C is Received

Here, once again a match is obtained by the comparators 1030 indicating that the hazard cache entry relating to the transaction A is held in the hazard cache and that the transaction C would be fulfilled by the fulfilment of the transaction A. The action taken by the controller 1010 therefore includes issuing an "append" message to the hazard list and the controller 1300. As mentioned above, the issuing of the "append" message initiates the dropping or discarding of the transaction C such that the transaction C is not issued or queued for issue for fulfilment by the next-stage circuitry.

At the hazard list, the response to the "append" message is again as follows:

The tail flops are again accessed at the entry addressed by the transaction identifier of the transaction A to set the tail indicator at the RHS of that entry to 0 (not a tail).

The tail flops are accessed at the entry address by the transaction identifier of the transaction C at which the LHS tail indicator is set to 1 (third item in the linked list is the tail of the list)

The pointer RAM 1330 is also accessed at the entry addressed by the transaction identifier of the transaction A (which still has a vacant entry at its RHS) and, at the RHS of that entry, a pointer which identifies the transaction B (in other words, a pointer to the TxnID=4) is inserted.

Figure 14:
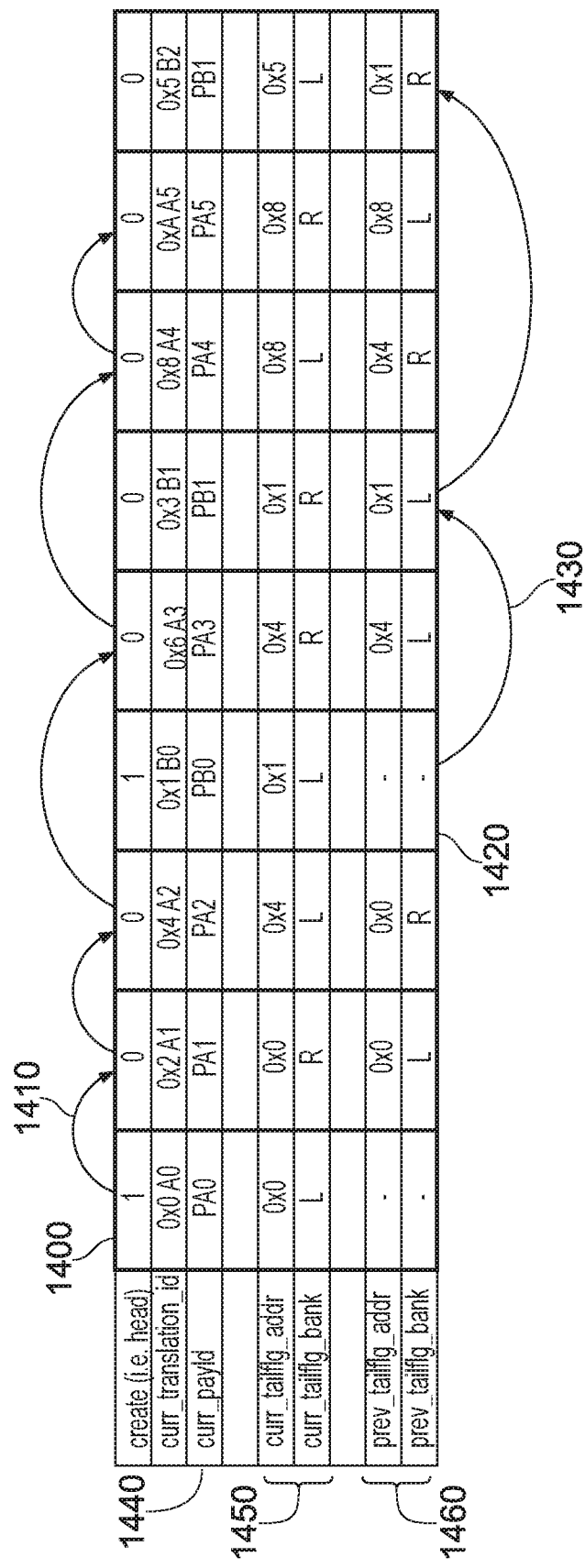

FIG. 14 provides a schematic worked example in more detail and represents two linked lists of transactions. A first linked list starts with a transaction 1400, for which a create message is issued (indicated by a value of 1 in the first row of FIG. 14) and the resulting linked list is shown by a schematic path 1410. A second linked list starts with a transaction 1420 and follows a schematic path 1430. FIG. 14 also has a representation of so-called payloads 1440 which can optionally be stored in an optional payload RAM again having an LHS and in RHS and being addressable by transaction identifier. Rows 1450 indicate a location at which a new item should be stored in the tail flops (and correspondingly in the pointer RAM and the payload RAM if used) and rows 1460 indicate the previously-used location in the tail flops and the pointer RAM and optionally payload RAM.

The representation of FIG. 14 is such that columns is drawn in FIG. 14, starting with the transaction 1400, represent successive transaction-receipt and handling cycles. This notation is carried forward to FIGS. 15 and 16 which respectively indicate the contents of the tail flops (FIG. 15) and the pointer RAM (FIG. 16) during receipt of the set of transactions shown in FIG. 14, with each entry in the tail flops and the pointer RAM being shown by a respective row addressed by a transaction identifier 1500, 1600 and drawn as (LHS, RHS) to indicate the two items within each entry. Note that writing to the tail flops and the pointer RAM is shown as taking place (or at least being completed) one cycle after the relevant transaction has been received. The evolution of the contents of the tail flops and pointer RAM in FIGS. 15 and 16 follows the principles set out above.

Unwinding the List by Reading from the Tail Flops and Pointer RAM

The output circuitry is configured, in response to the resolution of a data handling transaction in the set of associated data handling transactions, to detect whether an entry relating to that resolution is held by the attribute storage memory and to detect whether the list memory currently stores data defining a set of associated data handling transactions including the transaction for which the resolution has been received.

Therefore, in response to receipt of a resolution of a particular transaction (for example, receipt of a VA translation from next-stage circuitry—assume this is for the TxnID 0 in this example), the following steps are performed:

- Update the µTLB
- Initiate updating of the main TLB (noting that this can be a somewhat slower process)
- Comparators 1030 compare the transaction identifier 0 with those stored in the hazard cache to identify a head item of a linked list
- Controller 1010 invalidates that hazard cache entry to prevent further list items being appended to it
- Controller 1300 detects LHS of the tail flop entry for that transaction identifier 0. If this is "1" indicating "tail of list" then the transaction response is returned for that transaction identifier 0 but the process then stops. If however the LHS of the tail flop entry is "zero" then the controller 1300 detects the LHS of the pointer RAM for that entry which indicates the next transaction 2 in the linked list. The question of whether this transaction is the tail of the list is indicated by the RHS of the tail flop entry for the returned transaction identifier 0; if not then the RHS of the pointer RAM for the returned transaction identifier 0 indicates the next transaction 4 in the linked list. Now that the LHS and the RHS for the entry having TxnID=0 have been checked, the next check will be to the LHS of the entry having TxnID=4 and so on through the linked list.

Invalidation of Entries in the Hazard Cache

An entry in the hazard cache can be invalidated in response to one or more of the following occurrences:

- resolution of the transaction for which the hazard cache entry was first established
- detection, by the controller 1010, that a linked list has reached a maximum allowable or threshold number of entries, for example 16 entries (Optionally limiting the maximum number of entries in a hazard list may provide an effective and simple-to-implement method for avoiding one or more very large list(s) of hazarded transactions blocking other lists from making forward progress (an issue sometimes referred to as "starvation") once the unwinding process of the large list(s) has started. It is considered useful to avoid starvation scenarios, especially but not exclusively in systems with multiple upstream agents that try to access shared downstream resources.)
- a requirement, in response to a newly received transaction, to make available space in the hazard cache Whatever is the cause of an invalidation, the effect is such that no further list items can be appended to a list associated with that hazard cache entry. This can be achieved by setting a validity flag for that cache entry to "invalid" or (in other embodiments to be discussed below) by setting a "do not append" flag or indicator associated with the entry.

Second Example Embodiment

In the second embodiment, the control circuitry 1010 is configured to store data defining a data handling transaction in the list memory in response to information relating to that data handling transaction being displaced from the attribute storage circuitry by storage of data defining an attribute of another data handling transaction.

Figure 17:
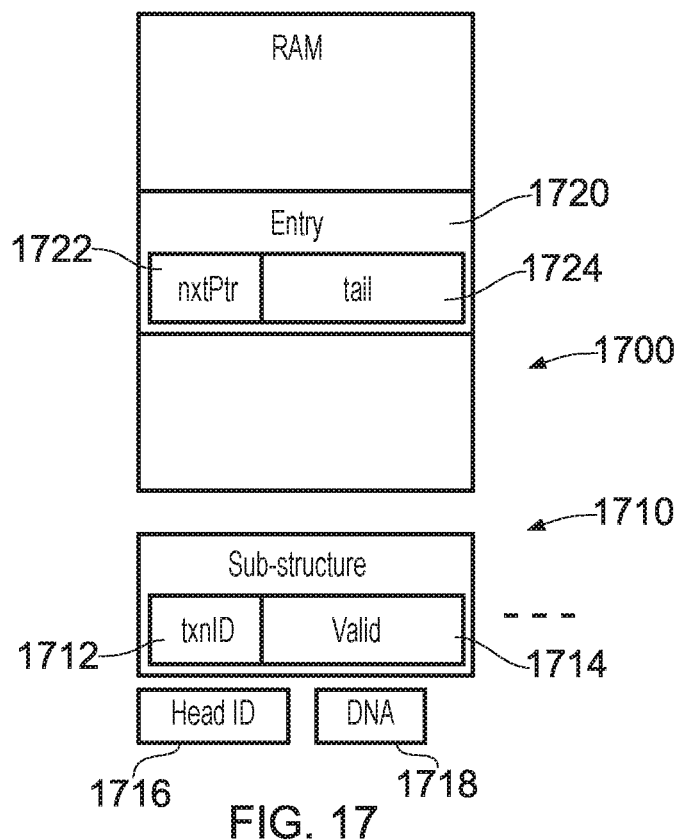
FIGS. 17 and 18 schematically illustrate further examples of hazard cache and hazard list circuitry.
Figure 18:
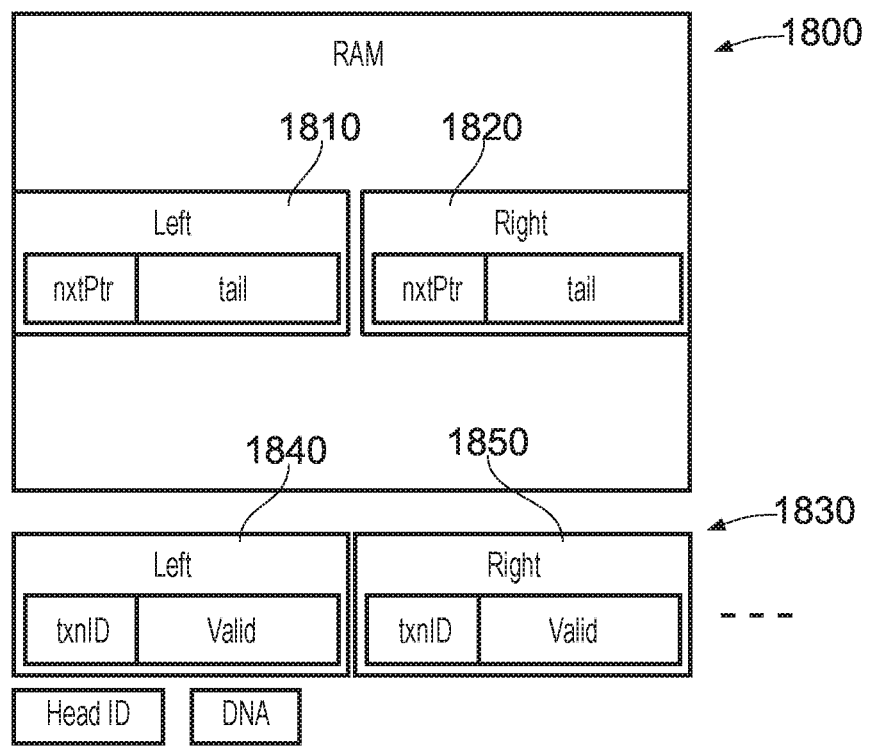

FIGS. 17 and 18 schematically illustrate aspects of a second embodiment in which, in contrast to the first embodiment in which the hazard list was represented by multiple storage entities (such as the tail flops and the pointer RAM, a unified list RAM 1700, 1800 is provided. Note that in FIG. 17 each RAM entry 1720 (addressable as before by TxnID) holds one set of values, in FIG. 18 each RAM entry has an LHS 1810 and a RHS 1820. As before, this feature allows two sets of data to be read in a single operation and can help to avoid RAM to RAM loops.

A RAM entry 1720 (or one of the LHS 1810 and RHS 1820) provides a next transaction pointer 1722 and a tail flag 1724. The next pointer 1722 indicates the next item in the linked list and the tail flag indicates whether this is the tail or last entry in the linked list. A payload item (not shown in FIG. 17 or 18) may optionally be provided at each RAM entry or each LHS/RHS of a RAM entry.

The hazard cache can similarly be treated as a set or unitary entries (1710, FIG. 17) or as entries 1830 having a LHS 1840 and an RHS 1850 (FIG. 18). In each case the following is stored: a transaction ID TxnID 1712, a valid flag 1714, a head ID 1716 indicating the head of the relevant linked list and a "do not append" (DNA) flag 1718. In FIG. 18 the head ID and DNA flag are common to the LHS and RHS.

A particular difference between the arrangement of the first and second embodiments is that at any time, the hazard list in the first embodiment is complete, which is to say the linked list of transactions can be fully recovered from the hazard list at any time. In the second embodiment, the contents of a hazard cache entry are not written to the hazard list until they are displaced by new data being written to the hazard cache. This means that the recovery of the linked list requires an examination of the hazard cache as well as the hazard list.

Assume once again for the purposes of the example that the three transactions are associated with transaction identifiers as follows:

| Transaction | Transaction Identifier (TxnID) |
|---|---|
| A | 0 |
| B | 2 |
| C | 4 |

Transaction A is Received

At the receipt of the transaction A, assume that no previously received transaction for which a valid entry (and one which does not have the "DNA" flag set to "do not append") is currently held in the hazard cache is such that the transaction A would be fulfilled by servicing of that previously received transaction. In other words, the comparisons performed by the comparators 1030 do not obtain a match. The actions taken by the controller 1010 therefore include (for the embodiment of FIG. 17):

- set head ID=0
- set TxnID=0
- set valid=1 (that is to say, valid)
- set (or retain) DNA=0 (appends are possible)
- do not write anything to RAM 1700

For the embodiment of FIG. 18, these operations are conducted in respect of the LHS 1840.

Transaction B is Received

Here, a match is obtained by the comparators 1030 indicating that the hazard cache entry relating to the transaction A is held in the hazard cache and that the transaction B would be fulfilled by the fulfilment of the transaction A. The action taken by the controller 1010 therefore includes (for the embodiment of FIG. 17):

the hazard cache entry is now full, so the entry relating to the transaction A is written to the hazard list as follows:
  write to entry addressed by TxnID=0
  nxtPtr=2
  tail=0 (indicating that the end item of the list still resides in the hazard cache)
  in the cache entry 1710:
  retain head ID=0
  set TxnID=2
  retain valid=1 (that is to say, valid)
  retain DNA=0 (appends are possible)

For the embodiment of FIG. 18, there remains space in the RHS cache entry, so the information written to the RHS is as follows:
  retain head ID=0
  set TxnID=2
  set valid=1 (that is to say, valid)

At the LHS, the information written is as follows:
  retain valid=1

(Note that in other examples, "valid" for the LHS could be set to 0 when the valid flag is set to 1 for the RHS, as the presence of valid data at the RHS indicates that valid data must also be present in the LHS).

Transaction C is Received

Once again, a match is obtained by the comparators 1030 indicating that the hazard cache entry relating to the transaction A is held in the hazard cache and that the transaction B would be fulfilled by the fulfilment of the transaction A. The action taken by the controller 1010 therefore includes (for the embodiment of FIG. 17)
  the hazard cache entry relating to the transaction B is written to the hazard list as follows:
  write to entry addressed by TxnID=2
  nxtPtr=4
  tail=0
  in the cache entry 1710:
  retain head ID=0
  set TxnID=4
  retain valid=1 (that is to say, valid)
  set (or retain) DNA=0 (appends are possible)

With regard to the embodiment of FIG. 18, the LHS and RHS of the cache entry (transactions A and B) are written to the RAM 1800 and the transaction C is written to the LHS of the cache entry:
  the hazard cache LHS and RHS entries relating to the transactions A and B are written to the hazard list as follows:
  write to entry addressed by TxnID=0
  LHS 1810
    nxtPtr=2
    tail=0
  RHS 1820
    nxtPtr=4
    tail=0

The transaction C is written to the LHS cache entry 1840 as follows:
  retain head ID=0
  set TxnID=4
  retain valid=1 (that is to say, valid)
  set (or retain) DNA=0 (appends are possible)

Unwinding the List in the Second Embodiment

As mentioned above, this refers to the process of receiving one response for a transaction in the list (such as the head transaction in the present examples) and traversing the list so as to be able to return that response as though it were a response to each transaction in the list.

In the examples of the hazard cache and hazard list just described, it may be that at a particular point in time, the totality of the list is represented by contents of the list RAM 1700, 1800 and contents of a current cache entry. In an example below, the list can be "finalised" or moved entirely to the RAM. However, assuming that this has not happened, then the following steps may be performed to unwind the list.

Finalising a List

One option, available to the controller 1010 at any stage, is to "finalise" the list. This may be performed if, for example, a cache entry needs to be freed up to make room for a new cache entry corresponding to a newly received transaction which does not form part of any existing linked list. This involves, in the example of FIG. 17:
  move current cache entry to RAM using the techniques discussed above in connection with transaction C
  invalidate cache entry or at least set DNA=1 (appends not allowed)

In the example case of FIG. 18:
  if the LHS cache entry was most recently written, move the LHS cache entry to the LHS of the RAM entry addressed by the TxnID of the preceding transaction in the list; or
  if the RHS cache entry was most recently written, move the LHS and RHS cache entries to the LHS and RHS of the RAM entry addressed by the TxnID of the transaction preceding that referred to in the LHS cache entry A finalised list will be entirely defined by information in the RAM 1700, 1800. The tail ID of the final entry in the list will be "1" (indicating a tail item).

Detecting a Finalised or Non-Finalised List at List Unwinding

First, the controller 1010 examines the cache to detect whether a valid entry exists with the value of head ID equal to the transaction ID of the newly returned response.

If no valid entry is found, then the relevant list is entirely held by the RAM 1700, 1800 and starts at the RAM entry addressed by the transaction ID of the newly returned response. The list is traversed as discussed below under the heading "finalised list".

Otherwise, if an entry is found in the cache, then the controller sets the DNA flag to 1 (do not append any further entries to this list). The list is then traversed as set out below under the heading "non-finalised list".

Example—Traversing a "Non-Finalised" List

To unwind the list in this situation the cache is checked at each stage at which a RAM read is performed in the list traversal, in order to detect whether a next (and indeed last) list item (or entry defining LHS/RHS items) is held by the cache.

In the case of FIG. 17:
a) return the response for the transaction identified by that response (910, FIG. 9)
b) detect TxnID of the returned response
c) retrieve RAM 1700 entry addressed by that TxnID
d) for FIG. 17, this indicates the next transaction in the list. Return the response for that next transaction (920, 930, FIG. 9);
e) assuming the tail ID is 0 (which will always be the case in the situation of a non-finalised list), check cache for an entry having that transaction ID;

f) if a cache entry is found, that will indicate the last list item. Return response for that item and end. Otherwise, retrieve RAM 1700 entry addressed by that next transaction ID
g) repeat (d) and (e) until either the RAM tail ID=1 indicating the last transaction in the list has been retrieved (940, FIG. 9), or the last transaction in the list is obtained from the cache entry in step (f).

In the case of FIG. 18:
a) return the response for the transaction identified by that response (910, FIG. 9)
b) detect TxnID of the returned response
c) retrieve RAM 1800 entry addressed by that TxnID
d) for FIG. 18, the LHS indicates the next transaction in the list. Return the response for that next transaction (920, 930, FIG. 9);
e) assuming that tail ID=0 for the LHS, the RHS indicates the next transaction in the list. Return the response for that next transaction (920, 930, FIG. 9);
f) assuming the RHS tail ID is 0 (which will always be the case in the situation of a non-finalised list), check cache for an entry having that transaction ID;
g) if a cache entry is found, that will indicate the last list item. Return response for that item and end. Otherwise, retrieve RAM 1800 entry addressed by that next transaction ID
h) repeat (d) and (e) until either the RAM tail ID=1 indicating the last transaction in the list has been retrieved (940, FIG. 9), or the last transaction in the list is obtained from the cache entry in step (f).

Example—Traversing a "Finalised" List

To unwind the list in this situation the same process is carried out but the check of the cache will fail at each occasion it is carried out. For convenience, it could stop being carried out after one failure, or it may be more convenient in circuit terms to continue to run the check of the cache. In any event, the process of unwinding continues until tail ID=1 indicating the last transaction in the list has been retrieved (940, FIG. 9)

Example Uses of First and Second Embodiments

The distributed arrangement of the first embodiment is particularly suited for use within the TBU as discussed above, and the arrangement of the second embodiment is particularly suited for use in the TCU as discussed above. However, either embodiment could be used in either circuitry.

Summary and Example Technical Effects

In summary, embodiments of the present disclosure can ensure or provide greater assurance of coherency of a hazard cache with respect to cache maintenance operations such as invalidate requests without necessarily introducing the need of implementing a full invalidate decoder and invalidate matching logic. Subsequently there is no need to store any additional request data that would be required only for invalidate matching.

The same mechanism, with only relatively little extra logic, is also able to break up malicious transaction patterns (such as groups of transactions of greater than the threshold number such as the value of 16 mentioned as an example above) that could otherwise lead to so-called starvation scenarios.

A hazard cache is used in order to reduce the number of downstream transactions by matching incoming transactions and keeping track of the hazarded transactions. Once the transaction response from downstream is received the hazard circuitry applies the response to all applicable hazarded transactions and therefore can potentially fulfil the set of upstream requests without the actual area and power overhead of a regular cache.

However, such a structure effectively behaves like a regular cache and it is also potentially subject to cache maintenance operations such as invalidate operations. Hence, the hazard cache should ensure that it does not apply stale response payloads to unrolled hazard transactions.

In other situations this would require implementing a full invalidate decoder and an invalidate-matching logic that identifies the transactions that are affected by the invalidate operation. This decoder and matching functionality would represent a substantial amount of design complexity and requires a non-negligible silicon area and power consumption. In embodiments of the technology such requirements are at least alleviated.

Being able to fulfil the requirements imposed by invalidate requests without designing and implementing the corresponding invalidation logic can provide an advantage over other example arrangements.

The techniques can achieve this goal by simply closing a hazard list once any invalidate request arrives at the hazard cache, which means that the invalidate operation doesn't need to be decoded at all. Only detection of an invalidate request is required. Subsequently there is no need to store any additional request data that would be required only for invalidate matching.

Once an invalidate request gets detected all entries in the hazard cache get invalidated and therefore new transaction requests will have to create new hazarding lists since appending to the previous ones is no longer possible. The hazarding lists that have been created till that point in time are still valid and maintained in a RAM based structure and can be still fulfilled by the response of their corresponding head of the list. The only visible effect of the invalidate operation is that new incoming transactions from upstream are required to start new hazard lists with their new heads and append to them. Subsequently for each newly created list a single request needs to be sent downstream. This way the mechanism ensures that post-invalidate hazarded requests may only be fulfilled by post-invalidate responses.

In addition to that, the same mechanism of closing a hazard list allows the technology to deal with malicious traffic patterns that could lead to starvation scenarios. The only difference is that instead of closing all currently opens lists due to an invalidate operation only an individual list gets closed as soon as a certain number of append operations have been counted for this hazard list. This simple mechanism ensures that a single stream of transactions which all hazard on each other cannot block the response channel for an indefinite amount of time. The only additional logic required is a simple counter for each of the hazard cache entries. Unfortunately, prematurely closing a hazard list due to reaching its limit of append operations leads to the creation of a new list and an additional downstream transaction. However, depending on the configurable counter limit the impact on power and performance can be very low while still guaranteeing forward progress for all other hazarded transactions with only a very small logic overhead.

A traditional approach to guarantee forward progress for all hazarded transactions would at least require multiple unrolling slots combined with an arbiter that has a built-in anti-starvation mechanism which would require more silicon area and creates a significantly increased design/validation complexity.

When considering the low complexity and small performance/power impact of the invented mechanism compared to the high complexity and significantly larger silicon area of the traditional approach, the new mechanism will be advantageous in many applications.

Summary Method

Figure 19:
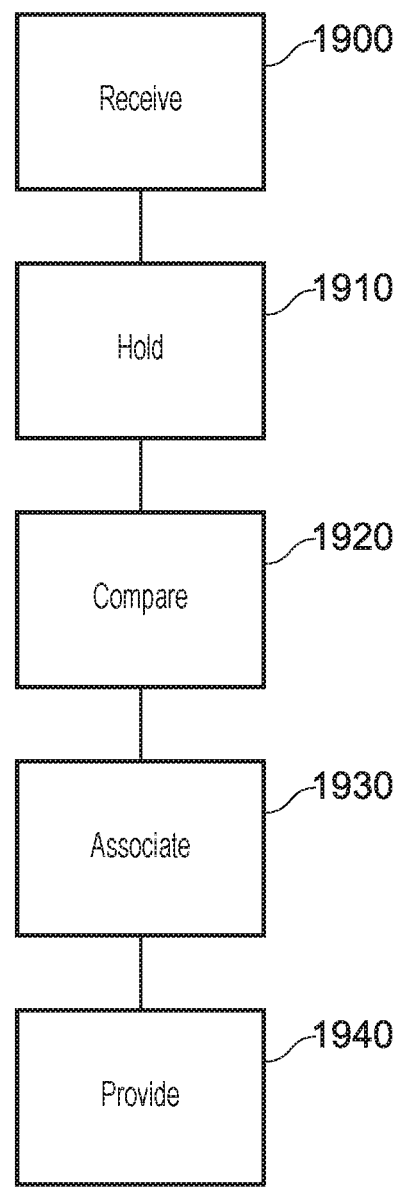
FIG. 19 is a schematic flowchart illustrating a method.

FIG. 19 is a schematic flowchart illustrating a method comprising:

receiving (at a step 1900) data handling transactions from transaction source circuitry, each data handling transaction being defined by a respective set of one or more transaction attributes;

holding (at a step 1910) data defining at least a transaction attribute of one or more respective data handling transactions;

comparing (at a step 1920) a transaction attribute of a given data handling transaction with the held data to detect whether the given data handling transaction would be resolved by any data handling transaction for which attribute data is held;

associating (at a step 1930) the given data handling transaction with the respective data handling transaction detected by the comparing step to form a set of associated data handling transactions when the comparing step detects that the given data handling transaction would be fulfilled by the respective data handling transaction for which attribute data is held; and providing (at a step 1940), in response to resolution of a data handling transaction in the set of associated data handling transactions, that resolution to the transaction source circuitry as a resolution of each of the set of associated transactions.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

We claim:

1. Circuitry comprising:

attribute storage circuitry having a plurality of entries to hold data defining at least a transaction attribute of one or more respective data handling transactions initiated by transaction source circuitry;

comparator circuitry to compare a transaction attribute of a given data handling transaction with data held by the attribute storage circuitry to detect whether the given data handling transaction would be resolved by any data handling transaction for which attribute data is held by a respective entry in the attribute storage circuitry; and control circuitry to associate the given data handling transaction with the respective entry in the attribute storage circuitry to form a set of associated data handling transactions when the comparator circuitry detects that the given data handling transaction would be fulfilled by the data handling transaction for which attribute data is held by the respective entry in the attribute storage circuitry;

a list memory to store data defining at least those of the set of associated data handling transactions which are not currently held by the attribute memory, in which the list memory is configured to store, as a single entry in the list memory, data defining two or more data handling transactions; and the control circuitry comprising output circuitry responsive to a resolution of a data handling transaction in the set of associated data handling transactions, to provide that resolution to the transaction source circuitry as a resolution of each of the set of associated transactions.

2. The circuitry of claim 1, in which the control circuitry is configured, when the comparator circuitry detects that the given data handling transaction would not be fulfilled by the data handling transaction for which attribute data is held by any entry in the attribute storage circuitry, to generate, from the given data handling circuitry, an entry for storage by the attribute storage circuitry.

3. The circuitry of claim 2, in which the control circuitry is configured, when the comparator circuitry detects that the given data handling transaction would not be fulfilled by the data handling transaction for which attribute data is held by any entry in the attribute storage circuitry, to initiate issue of the given transaction for resolution.

4. The circuitry of claim 1, in which the given data handling transaction is a data handling transaction most recently initiated by the transaction source circuitry.

5. The circuitry of claim 2, in which the set of associated data handling transactions comprises a linked list of data handling transactions.

6. The circuitry of claim 5, in which the control circuitry is configured to associate the given data handling transaction with the respective entry in the attribute storage circuitry as a new last item in the linked list of data handling transactions associated with that entry in the attribute storage circuitry when the comparator circuitry detects that the given data handling transaction would be fulfilled by the data handling transaction for which attribute data is held by the respective entry in the attribute storage circuitry.

7. The circuitry of claim 5, in which the control circuitry is configured, when the comparator circuitry detects that the given data handling transaction would not be fulfilled by the data handling transaction for which attribute data is held by any entry in the attribute storage circuitry, to create a new linked list having the given data handling transaction as a head list item.

8. The circuitry of claim 1, in which the control circuitry is configured to store data defining a data handling transaction in the list memory in response to creation of an entry in the attribute memory for that data handling transaction.

9. The circuitry of claim 1, in which the control circuitry is configured to store data defining a data handling transaction in the list memory in response to information relating to that data handling transaction being displaced from the attribute storage circuitry by storage of data defining an attribute of another data handling transaction.

10. The circuitry of claim 9, in which the set of associated data handling transactions comprises a linked list of data handling transactions.

11. The circuitry of claim 1, in which the list memory comprises entries addressable by a transaction identifier of a data handling transaction in the set of associated data handling transactions.

12. The circuitry of claim 1, in which the output circuitry is configured, in response to the resolution of a data handling transaction in the set of associated data handling transactions, to detect whether an entry relating to that resolution is held by the attribute storage circuitry and to detect whether the list memory currently stores data defining a set of associated data handling transactions including the transaction for which the resolution has been received.

13. The circuitry of claim 1, in which the data handling transaction is an address translation transaction to request a translation of an input memory address in an input memory address space to an output memory address in an output memory address space.

14. The circuitry of claim 13, in which:
(a) the input memory address is a virtual memory address;
    the input memory address space is a virtual memory address space;
    the output memory address is a physical address; and
    the output memory address space is a physical address space; or
(b) the input memory address is a virtual memory address;
    the input memory address space is a virtual memory address space;
    the output memory address is an intermediate physical address; and
    the output memory address space is an intermediate physical address space; or
(c) the input memory address is an intermediate physical memory address;
    the input memory address space is an intermediate physical memory address space;
    the output memory address is a physical address; and
    the output memory address space is a physical address space.

15. Memory address translation circuitry comprising:
the circuitry of claim 13;
an address translation buffer to store data defining one or more memory address translations;
transaction source circuitry to issue a data handling transaction to further circuitry in the case that a required memory address translation is not provided by data currently held in the address translation buffer, the transaction source circuitry being configured to receive data defining the required memory address translation as a resolution of the data handling transaction.

16. The memory address translation circuitry of claim 15, comprising:
the further circuitry;
in which the further circuitry is configured to interact with a data memory and to issue, as a further data handling transaction, a transaction to obtain data defining the required memory address translation from information stored in the data memory;
the further circuitry comprising a further instance of the circuitry of claim 5, the further instance being configured to control handling of the further data handling transaction.

17. A method comprising:
receiving data handling transactions from transaction source circuitry, each data handling transaction being defined by a respective set of one or more transaction attributes;
holding data defining at least a transaction attribute of one or more respective data handling transactions;
comparing a transaction attribute of a given data handling transaction with the held data to detect whether the given data handling transaction would be resolved by any data handling transaction for which attribute data is held;
associating the given data handling transaction with the respective data handling transaction detected by the comparing step to form a set of associated data handling transactions when the comparing step detects that the given data handling transaction would be fulfilled by the respective data handling transaction for which attribute data is held;
storing data defining at least those of the set of associated data handling transactions which are not currently held by the holding step, the storing step including storing, as a single entry in the list memory, data defining two or more data handling transactions; and
providing, in response to resolution of a data handling transaction in the set of associated data handling transactions, that resolution to the transaction source circuitry as a resolution of each of the set of associated transactions.

* * * * *